United States Patent
Fujii et al.

(10) Patent No.: US 7,339,697 B2
(45) Date of Patent: Mar. 4, 2008

(54) APPARATUS FOR AND METHOD OF RECORDING IMAGE BASED ON DETECTED RECORDING DUTY RATIO

(75) Inventors: Takeshi Fujii, Hadano (JP); Youichi Hatano, Hasuda (JP); Katsuto Sumi, Minamiashigara (JP); Akiko Yamashita, Minamiashigara (JP); Fumiaki Miyamaru, Minamiashigara (JP)

(73) Assignee: Fujifilm Corporation, Tokyo (JP)

( * ) Notice: Subject to any disclaimer, the term of this patent is extended or adjusted under 35 U.S.C. 154(b) by 849 days.

(21) Appl. No.: 09/810,661

(22) Filed: Mar. 19, 2001

(65) Prior Publication Data

US 2001/0022658 A1    Sep. 20, 2001

(30) Foreign Application Priority Data

Mar. 17, 2000    (JP)    ............................. 2000-077284

(51) Int. Cl.
G06K 15/12    (2006.01)
G03F 3/08    (2006.01)

(52) U.S. Cl. ....................... 358/1.7; 358/521

(58) Field of Classification Search .......... 358/1.1–1.9, 358/1.11–1.18, 3.01–3.06, 521, 3.3, 2.1, 3.09, 358/3.1, 3.13; 382/264
See application file for complete search history.

(56) References Cited

U.S. PATENT DOCUMENTS

| | | | |
|---|---|---|---|
| 4,501,016 A | * | 2/1985 | Persoon et al. ............. 382/272 |
| 5,687,002 A | | 11/1997 | Itoh |
| 5,731,884 A | * | 3/1998 | Inoue ........................ 358/3.06 |
| 5,783,356 A | * | 7/1998 | Bosschaerts et al. ........ 430/240 |
| 5,934,195 A | | 8/1999 | Rinke et al. |
| 2002/0149807 A1 | | 10/2002 | Sumi |
| 2004/0125118 A1 | | 7/2004 | Raunkjaer et al. |

FOREIGN PATENT DOCUMENTS

| | | | |
|---|---|---|---|
| EP | 0734147 A1 | * | 9/1996 |
| EP | 1136272 A2 | * | 9/2001 |
| JP | 69-191473 | | 8/1988 |
| JP | 2000-35673 | | 2/2000 |

OTHER PUBLICATIONS

Patent Abstracts of Japan 63-191473 Aug. 8, 1988.
Patent Abstracts of Japan 2000-35673 Feb. 2, 2000.

* cited by examiner

*Primary Examiner*—Dov Popovici
(74) *Attorney, Agent, or Firm*—Sughrue Mion, PLLC

(57) ABSTRACT

The intensity of a light beam is controlled accurately depending on an image to be recorded on a photosensitive medium. An apparatus for recording an image by scanning a photosensitive medium with a light beam generated based on an image signal has a recording duty ratio detector for detecting a recording duty ratio of an image to be recorded on the photosensitive medium based on the image signal, and a light beam intensity correcting memory for modulating the intensity of the light beam based on the detected recording duty ratio. Since the intensity of the light beam is modulated based on the recording duty ratio of the image recorded on the photosensitive medium, the amount of light of the light beam can be adjusted depending on the image actually recorded on the photosensitive medium.

14 Claims, 21 Drawing Sheets

APPARATUS FOR AND METHOD OF RECORDING IMAGE BASED ON DETECTED RECORDING DUTY RATIO

BACKGROUND OF THE INVENTION

1. Field of the Invention

The present invention relates to an apparatus for and a method of recording an image on a photosensitive medium by scanning the photosensitive medium with a light beam.

2. Description of the Related Art

There has heretofore been known an image recording apparatus for recording an image on a photosensitive medium such as a film by scanning the photosensitive medium with a light beam, as disclosed in Japanese laid-open patent publication No. 63-191473, for example.

The above publication refers to the following problem: When a halftone dot recorded on a film by a light beam by way of exposure is developed, it usually becomes slightly greater than the recorded halftone dot due to the Gaussian distribution of a light spot on the film. This phenomenon tends to be more noticeable when the developing liquid used to develop halftone dots is deteriorated. It has been described in the publication that since the extent by which the halftone dot becomes larger remains substantially constant irrespective of the size of the halftone dot, if the halftone dot is of a small size whose halftone dot % (hereinafter referred to as halftone %) is 10% or less, the effect that the larger halftone dot has on an image representation is greater than if the halftone dot is of a size for a medium gradation.

To solve the above problem, the publication discloses a light beam intensity correcting circuit as shown in FIG. 18 of the accompanying drawings. As shown in FIG. 18, the light beam intensity correcting circuit has a light beam intensity correcting means 8 comprising a memory (memory table) 2, a D/A converter 4, and a buffer amplifier 6. A multigradation digital image signal a, e.g., a digital image signal a in 256 gradations (raging from 0 to 100 halftone %), is supplied to a comparator 10 and the memory 2 of the light beam intensity correcting means 8.

The comparator 10 compares a threshold signal, which is of a value in the range from 0 to 256, from a threshold memory 12 with the digital image signal a, and outputs a binary signal c, which is of a high level or a low level, indicative of the compared result. When the binary signal c is of a high level, a switch 14 has its common contact shifted to connect the light beam intensity correcting means 8 to an optical modulator 16, as shown.

The optical modulator 16 modulates the intensity of a laser beam depending on an output signal f from the light beam intensity correcting means 8. The intensity-modulated laser beam outputted from the optical modulator 16 is applied to record an image on a film 18.

The memory 2 stores an amount-of-light control value for keeping the amount of light of the laser beam at a constant level when the halftone % is in a shadow and medium range, and an amount-of-light control value for progressively reducing the amount of light of the laser beam when the halftone % is in a highlight range, i.e., 10% or less.

With the conventional light beam intensity correcting circuit shown in FIG. 18, the extent by which a halftone dot becomes greater in the highlight range is reduced depending on the degree of correction of the intensity of the laser beam, resulting in a halftone dot smaller than usual.

The above publication reveals that since the intensity of the laser beam is controlled to reduce the amount of light of the laser beam in the highlight range, the extent by which a halftone dot becomes greater in the highlight range is eliminated, resulting in an increase in the accuracy of the halftone dot representation.

However, the disclosed conventional image recording apparatus is disadvantageous in that since the intensity of the laser beam is corrected in a unit of halftone %, i.e., in a unit of the entire halftone dot, depending on the gradation of the input image signal, the intensity of the laser beam is corrected identically irrespective of the shape of the halftone dot.

Recently, there have been developed various CPT (Computer To Plate) exposure apparatus for performing a plate-making process by directly exposing a photosensitive printing plate to an image. For example, Japanese laid-open patent publication No. 2000-35673 discloses an inner-drum plate setter and a lithographic printing plate. When such a photographic printing plate is exposed to a halftone dot image by a laser beam, a new problem arises if the intensity of the laser beam is controlled to a small degree in a range of small halftone %.

The photographic printing plate comprises a support body supporting thereon a photosensitive layer where an area irradiated by a laser beam remains as a halftone dot image. As shown in FIG. 19 of the accompanying drawings, the photographic printing plate is basically produced from a photosensitive medium 32 which has a photosensitive layer 21 of a photopolymer disposed on a support body 20 of a metal base such as of aluminum or the like, and a transparent overcoat layer 22 disposed on the photosensitive layer 21 for blocking oxygen.

When light is applied to an area 23 of the photosensitive medium 32, the area 23 is hardened. Thereafter, the photosensitive medium 32 is heated to accelerate the hardening of the area 23. After the photosensitive medium 32 is heated, it is developed in an alkaline developing liquid, and the area of the photosensitive medium 32 which is not irradiated by the light is scraped off by a brush or the like, producing a printing plate 25 where the irradiated area 23 serves as an image area 24.

As a result of an experiment conducted on the photosensitive medium 32, it has been found that if the image area 24 is not hard enough and is present as an isolated image area or a small image area, it tends to fall off while the photosensitive medium 32 is being processed in the developing process.

It has also been found that in an image recording apparatus for scanning the photosensitive medium 32 directly with a light beam to form a halftone dot image according to an area modulation (area gradation) process, in order to sufficiently produce an image with small halftone %, i.e., a highlight image, and keep the highlight image with small halftone % sufficiently resistant to plate wear, it is necessary to expose the photosensitive medium 32 to an increased amount of recording light for the highlight image, as indicated by a qualitative characteristic curve 26 in FIG. 20 of the accompanying drawings, unlike the conventional arrangement shown in FIG. 18.

However, when the amount of recording light increases, halftone dots in the shadow range are clustered to reduce the number of resolution points of halftone %, resulting in such a problem that a black thin line within a highlight area and a white thin line within a shadow area have different thicknesses.

As indicated by a qualitative characteristic curve 27 in FIG. 21 of the accompanying drawings, it has also been found that when the amount of recording light increases, the amount of flaring light produced around an image area increases to create a fog in a non-image area, resulting an image irregularity.

SUMMARY OF THE INVENTION

It is therefore an object of the present invention to provide an apparatus for and a method of recording an image by accurately controlling the intensity of a light beam depending on the image to be recorded.

Another object of the present invention is to provide an apparatus for and a method of recording an image by making a highlight image recorded on a photosensitive medium, which comprises a support body supporting thereon a photosensitive layer where an area irradiated by light remains as an image, sufficiently resistant to plate wear, and preventing the image from suffering image irregularities.

Still another object of the present invention is to provide an apparatus for and a method of recording an image with a simple corrective arrangement without the need for a corrective memory table.

According to the present invention, there is provided an apparatus for recording an image by scanning a photosensitive medium with a light beam generated based on an image signal, comprising recording duty ratio detecting means for detecting a recording duty ratio of an image to be recorded on the photosensitive medium based on the image signal, and light beam intensity modulating means for modulating the intensity of the light beam based on the detected recording duty ratio.

Since the light beam intensity modulating means modulates the intensity of the light beam based on the recording duty ratio, detected by the recording duty ratio detecting means, of the image to be recorded on the photosensitive medium, the amount of light of the light beam can be adjusted depending on the image actually recorded on the photosensitive medium.

If the photosensitive medium is of such a nature that an area irradiated with light remains as an image, then the light beam intensity modulating means comprises means for modulating the intensity of the light beam to a higher level in a highlight area of the image. The plate wear resistance of the highlight area of the image on the photosensitive medium can be kept at a sufficient level.

The highlight area preferably comprises a highlight area smaller than 25% of all gradations of the image recorded on the photosensitive medium.

The recording duty ratio detecting means may comprise a low-pass filter. With the low-pass filter used, it is not necessary to use a correcting memory table.

The recording duty ratio detecting means may comprise means for detecting a recording duty ratio corresponding to a given area in the image recorded on the photosensitive medium. With this arrangement, it is not necessary to detect all duty ratios of the image, and the processing operation can be performed at a high speed.

If it is not necessary to detect all duty ratios of the image, then the apparatus may further comprise random number applying means for varying the position of the given area in the image with a random number, or random number applying means for varying the size of the given area in the image with a random number, or the light beam intensity modulating means may comprise random number applying means for applying a random number to the detected recording duty ratio, and means for modulating the intensity of the light beam based on the recording duty ratio to which the random number is applied by the random number applying means. In this manner, it is possible to eliminate beats that may occur between the given area for detecting the recording duty ratio and the recorded image.

If the light beam comprises a plurality light beams for simultaneously scanning the photosensitive medium to record the image thereon, then recording duty ratio detecting means may comprise a plurality of recording duty ratio detecting means associated respectively with images recorded on the photosensitive medium based on respective image signals to generate the light beams, respectively, and the light beam intensity modulating means may comprise a plurality of light beam intensity modulating means associated respectively with recording duty ratios detected by the recording duty ratio detecting means, respectively. With this arrangement, the intensities of the light beams can be modulated while eliminating beats.

If beats are allowed and the light beam may comprise a plurality of light beams for simultaneously scanning the photosensitive medium to record the image thereon, then the recording duty ratio detecting means may comprise means for determining an average recording duty ratio of images recorded on the photosensitive medium based on respective image signals to generate the light beams, respectively, and the light beam intensity modulating means may comprise means for modulating the brightnesses of the light beams based on the average recording duty ratio.

According to the present invention, there is also provided an apparatus for recording an image by scanning a photosensitive medium which is fed in an auxiliary scanning direction, with a light beam generated based on an image signal in a main scanning direction substantially perpendicular to the auxiliary scanning direction, comprising present recording duty ratio detecting means for detecting a present recording duty ratio of an image to be recorded on the photosensitive medium based on the image signal, light beam intensity modulating means for modulating the intensity of the light beam based on the detected present recording duty ratio, preceding recording duty ratio detecting means for detecting a preceding recording duty ratio of the image at a position scanned later than the present recording duty ratio detecting means in the main scanning direction, intensity modulation correcting means for comparing the detected preceding recording duty ratio and the detected present recording duty ratio to correct the modulation of the intensity of the light beam with the light beam intensity modulating means.

The preceding recording duty ratio detecting means detects a preceding recording duty ratio of the image at a position scanned later than the present recording duty ratio detecting means in the main scanning direction. The intensity modulation correcting means compares the detected preceding recording duty ratio and the detected present recording duty ratio with each other to correct the modulation of the intensity of the light beam with the light beam intensity modulating means. Thus, the intensity of the light beam can be corrected finely depending on details of the image.

If the photosensitive medium is of such a nature that an area irradiated with light remains as an image, then the light beam intensity modulating means may comprise means for modulating the intensity of the light beam to a higher level in a highlight area which is smaller than 25% of all gradations of the image.

If the preceding recording duty ratio is of a value corresponding to the highlight area which is smaller than 25% of all gradations of the image, and the present recording duty ratio is of a value corresponding to an area except the highlight area which is smaller than 25% of all gradations of the image, then the intensity modulation correcting means may comprise means for correcting the modulation of the intensity of the light beam to cause the intensity of the light beam to return from a given position in the highlight area to a normal intensity. With this arrangement, if the image includes a highlight area and an area other than a highlight area arranged forward in the main scanning direction, then it is possible to prevent the density from being stepped due to an increase in the amount of light applied to the image other than the highlight area.

According to the present invention, there is also provided a method of recording an image by scanning a photosensitive medium with a light beam generated based on an image signal, comprising the steps of detecting a recording duty ratio of an image to be recorded on the photosensitive medium based on the image signal, and modulating the intensity of the light beam based on the detected recording duty ratio.

Because the intensity of the light beam is modulated based on the detected recording duty ratio, the amount of light of the light beam can be adjusted depending on the image actually recorded on the photosensitive medium.

If the photosensitive medium is of such a nature that an area irradiated with light remains as an image, the step of modulating the intensity of the light beam may comprise the step of modulating the intensity of the light beam to a higher level in a highlight area which is smaller than 25% of all gradations of the image. Therefore, the plate wear resistance of the highlight area of the image on the photosensitive medium can be kept at a sufficient level.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
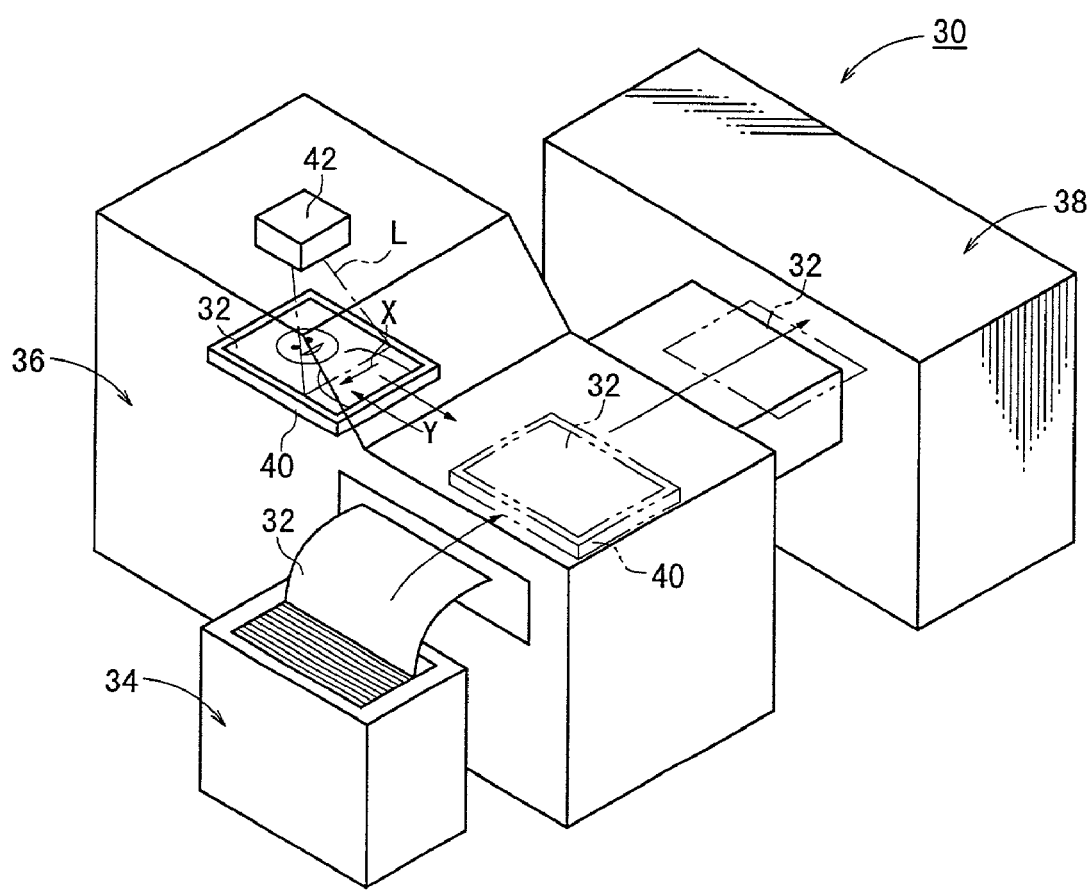
FIG. 1 is a perspective view of a printing plate producing system.

Like or corresponding parts are denoted by like or corresponding reference characters throughout views.

FIG. 1 shows in perspective a printing plate producing system 30 which incorporates an apparatus for and a method of recording an image according to the present invention. The printing plate producing system 30 is a CTP (Computer To Plate) system for producing a printing plate on which an image for generating a printed material is recorded, directly from digital image data without using a film.

As shown in FIG. 1, the printing plate producing system 30 basically comprises a plate supplying device 34 for supplying an unexposed photosensitive medium 32, an image recording apparatus 36 for scanning an unexposed photosensitive medium 32 with a light beam L modulated by an image signal to record an image on the photosensitive material 32, and a developing device 38 for developing the image recorded on the photosensitive medium 32.

Figure 19:
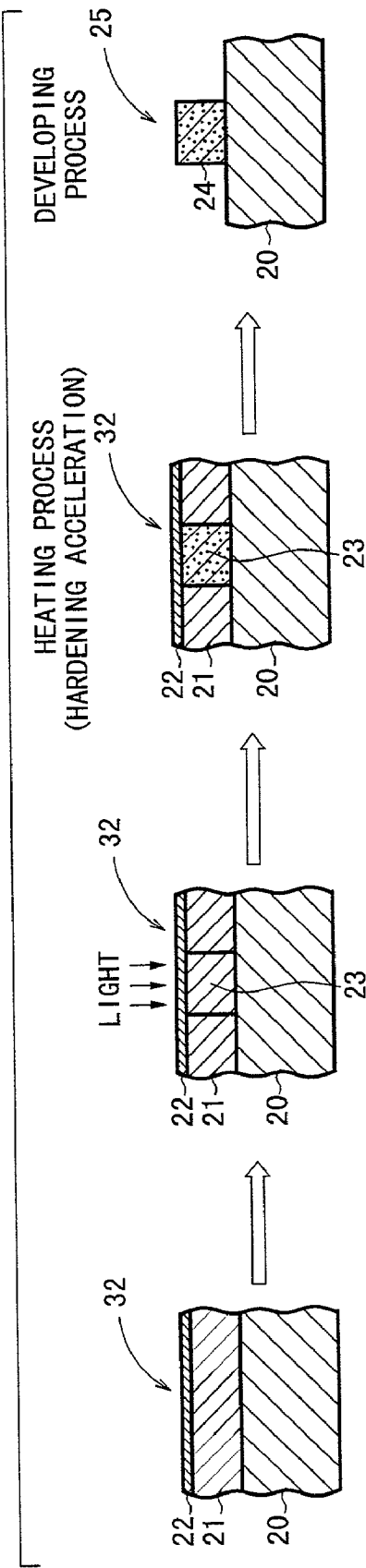
FIG. 19 is a cross-sectional view of a photosensitive medium where an area exposed to light remains as an image.
Figure 20:
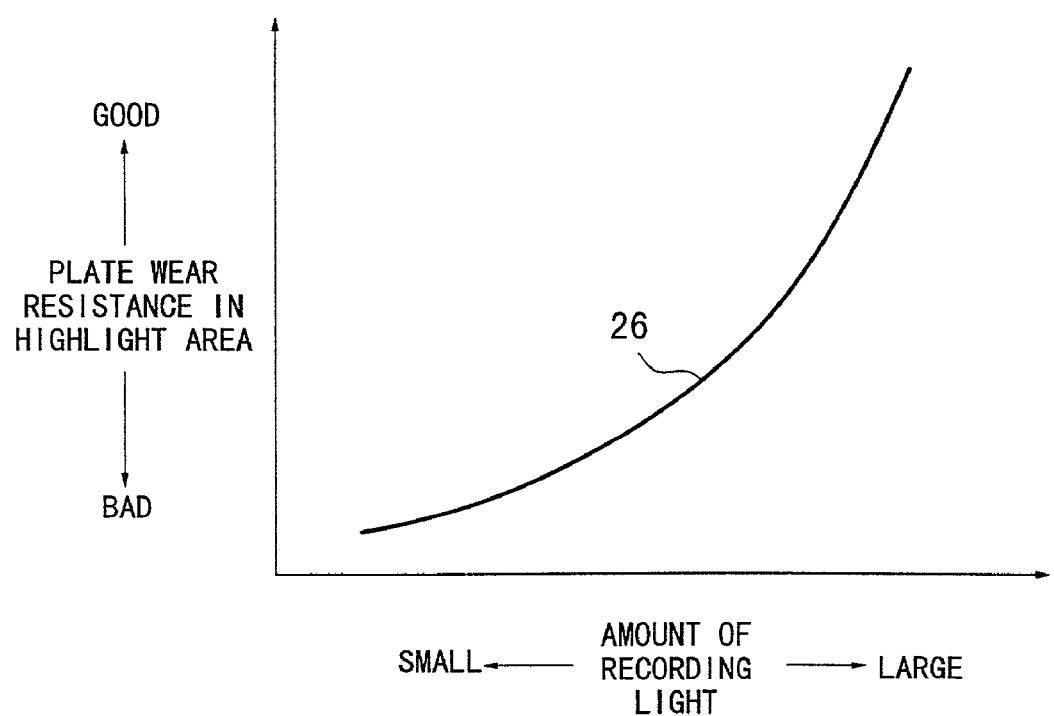
FIG. 20 is a diagram illustrative of the plate wear resistance of a photosensitive medium.
Figure 21:
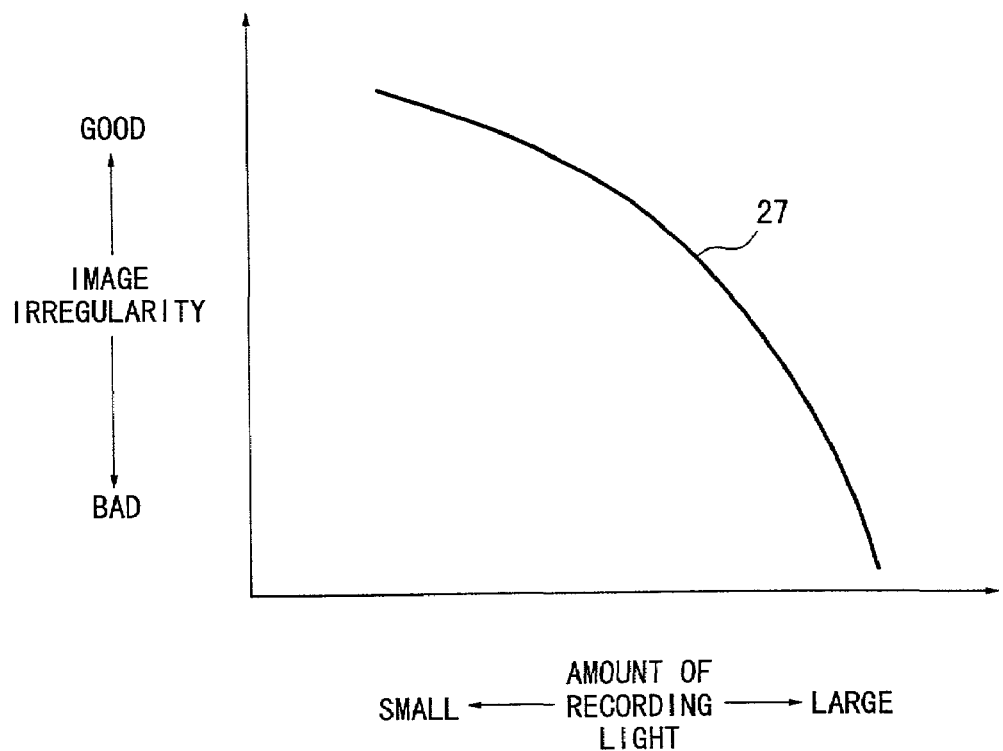
FIG. 21 is a diagram illustrative of the image irregularities of a photosensitive medium.

The photosensitive medium 32 is the same as the photosensitive medium 32 as shown in FIG. 19 which comprises the support body 20 supporting thereon the photosensitive layer 21 where an area irradiated by light remains as the image area 24.

The plate supplying device 34 holds a plurality of unexposed photosensitive mediums 32 and supplies one at a time of the unexposed photosensitive mediums 32 to the image recording apparatus 36 in the direction indicated by the arrow. The image recording apparatus 36 feeds the unexposed photosensitive medium 32 supplied from the plate supplying device 34 with an exposure stage 40 in an auxiliary scanning direction indicated by the arrow Y, and at the same time scans the unexposed photosensitive medium 32 with a laser beam L, which has been modulated by an image signal supplied from an image recording unit 42, in a main scanning direction indicated by the arrow X that is perpendicular to the auxiliary scanning direction, thereby recording a two-dimensional image, i.e., a halftone dot image, on the photosensitive medium 32 according to an area modulating process. The developing device 38 develops the image recorded on the photosensitive medium 32 that is supplied from the image recording apparatus 36.

Figure 2:
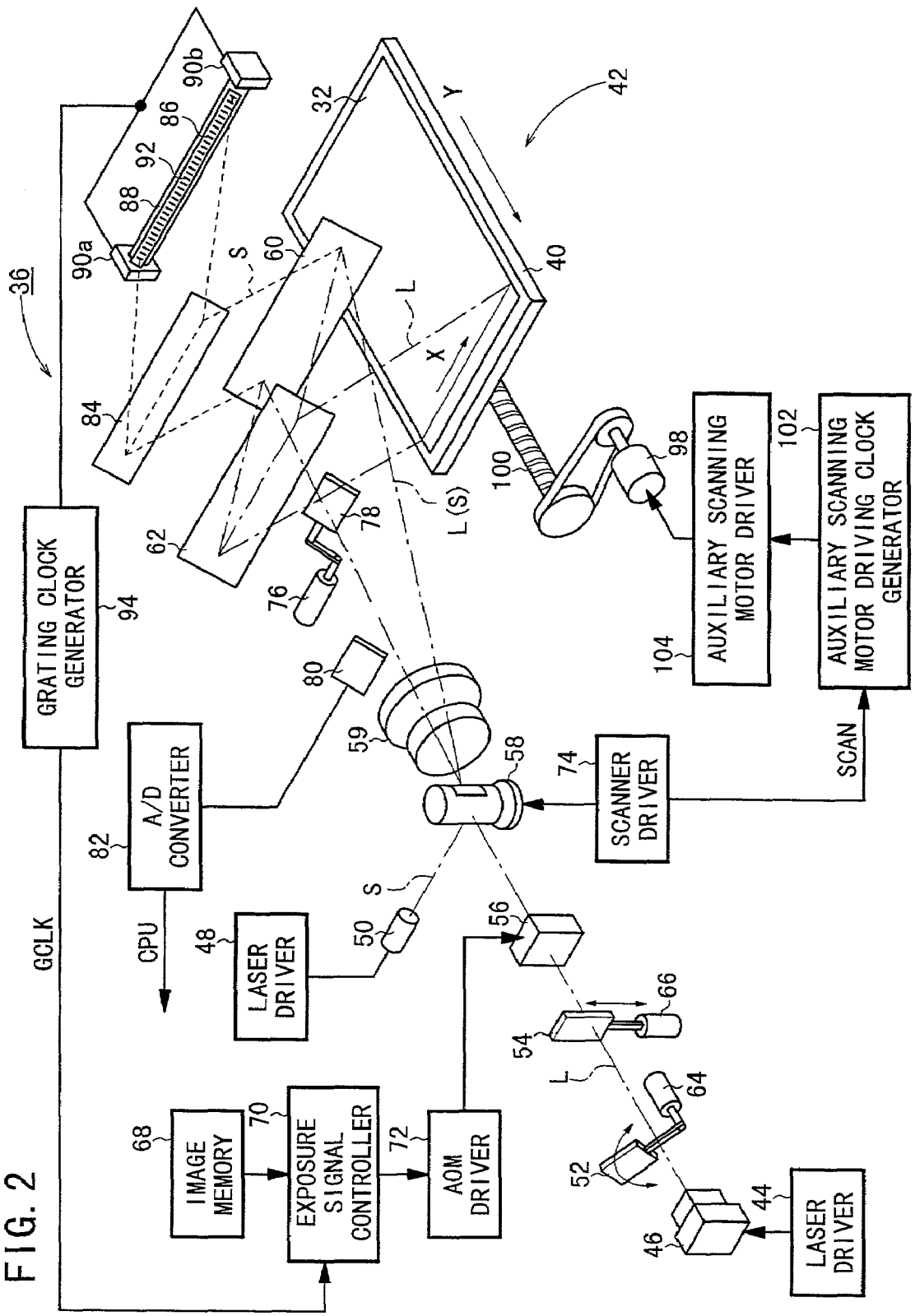
FIG. 2 is a schematic perspective view, partly in block form, of an image recording apparatus in the printing plate producing system shown in FIG. 1.

FIG. 2 shows in perspective the image recording apparatus 36 together with its control circuit shown in block form.

As shown in FIG. 2, the image recording apparatus 36 has a recording light source 46 energizable by a laser driver 44 for outputting a light beam L as a laser beam for recording an image on a photosensitive medium 32, and a synchronizing light source 50 energizable by a laser driver 48 for outputting a synchronizing laser beam S for generating a synchronizing clock signal used when the light beam L scans the photosensitive medium 32 in the main scanning direction.

The image recording apparatus 36 includes a mechanical shutter 52, a variable-transmittance ND filter 54, an acousto-optic modulator (AOM) 56, a resonant scanner 58 as a light beam deflecting means, a scanning lens 59, and reflecting mirrors 60, 62 which are successively disposed in the light path of the light beam L that is outputted from the recording light source 46.

The mechanical shutter 52 is movable into and out of the light path of the light beam L by a displacing unit 64 for selectively supplying and blocking the light beam L to the photosensitive medium 32. The variable-transmittance ND filter 54 is positionally variable with respect to the light path of the light beam L by a displacing unit 66, for controlling the amount of light of the light beam L.

The AOM 56, which functions as a light beam intensity modulating means, turns on and off the light beam L depending on an image to be recorded on the photosensitive medium 32. Image data for recording an image on the photosensitive medium 32 are read from an image memory 68, and converted into an on/off modulation signal by an exposure signal controller 70. The on/off modulation signal is supplied to an AOM driver 72. The AOM driver 72 supplies the AOM 56 with a drive signal which is a combination of signals having different frequencies, each turned on and off depending on the image data. Therefore, the light beam L is turned on and off depending on the image data by the AOM 56, and divided into a plurality of light beams L depending on the frequencies, which are supplied to the resonant scanner 58.

The resonant scanner 58 oscillates a mirror at a high speed with a drive signal supplied from a scanner driver 74, and deflects the light beam L from the AOM 56 in the main scanning direction X and supplies the deflected light beam L to the scanning lens 59. The light beam L that has passed through the scanning lens 59 is adjusted in its scanning speed with respect to the main scanning direction, and is then reflected by the reflecting mirrors 60, 62 toward the photosensitive medium 32.

A reflecting mirror 78 movable into and out of the light path of the light beam L by a displacing unit 76 is disposed between the reflecting mirror 62 and the photosensitive medium 32. When the reflecting mirror 78 is positioned in the light path of the light beam L, it reflects the light beam L to a photosensor 80 for monitoring an amount of light of the light beam L. The photosensor 80 detects an amount of light of the light beam L, which is converted by an A/D converter 82 into a digital signal that is supplied to a CPU, not shown.

The resonant scanner 58, the scanning lens 59, the reflecting mirror 60, a reflecting mirror 84, a reference grating 86, a light guide rod 88, and photosensors 90a, 90b are successively disposed in the light path of the synchronizing laser beam S that is outputted from the synchronizing light source 50.

The synchronizing light source 50 is positioned to apply the synchronizing laser beam S to the resonant scanner 58 at an angle different from the laser beam L. The synchronizing laser beam S is reflected and deflected in main scanning direction indicated by the arrow X by the resonant scanner 58. The synchronizing laser beam S deflected by the resonant scanner 58 travels through the scanning lens 59 to the reflecting mirror 60. The synchronizing laser beam S is reflected by the reflecting mirror 60 toward the reflecting mirror 84, which reflects the synchronizing laser beam S toward the reference grating 86. The synchronizing laser beam S passes through the reference grating 86.

The reference grating 86 is elongate in the main scanning direction X, and has a linear succession of slits 92 along its longitudinal direction, the number of the slits depending on the resolution.

The light guide rod 88, which is substantially cylindrical in shape, is disposed behind the reference grating 86 to receive the synchronizing laser beam S that has passed through the reference grating 86. The light guide rod 88 is made of a material capable of transmitting light therethrough. The synchronizing laser beam S that has entered the light guide rod 88 is repeatedly reflected therein and travels therethrough to the photosensors 90a, 90b which are disposed on the respective ends of the light guide rod 88.

To the photosensors 90a, 90b, there is connected a grating clock generator 94 for generating a grating clock signal GCLK comprising as many clock pulses as the number of the slits 92 of the reference grating 86 in each scanning cycle. The grating clock signal GCLK generated by the grating clock generator 94 is supplied, as a recording timing signal for the image data to be recorded with respect to the main scanning direction X, to the exposure signal controller 70.

The photosensitive medium 32 is positioned on and held by the exposure stage 40, which can be fed in the auxiliary scanning direction Y by a ball screw 100 that is rotatable about its own axis by an auxiliary scanning motor 98. The auxiliary scanning motor 98 is energizable by an auxiliary scanning motor driver 104 based on a motor driving reference clock signal that is supplied from an auxiliary scanning motor driving clock generator 102. The motor driving reference clock signal is generated by the auxiliary scanning motor driving clock generator 102 based on a scanning clock signal which is a main scanning start timing signal supplied from the scanner driver 74.

Figure 3:
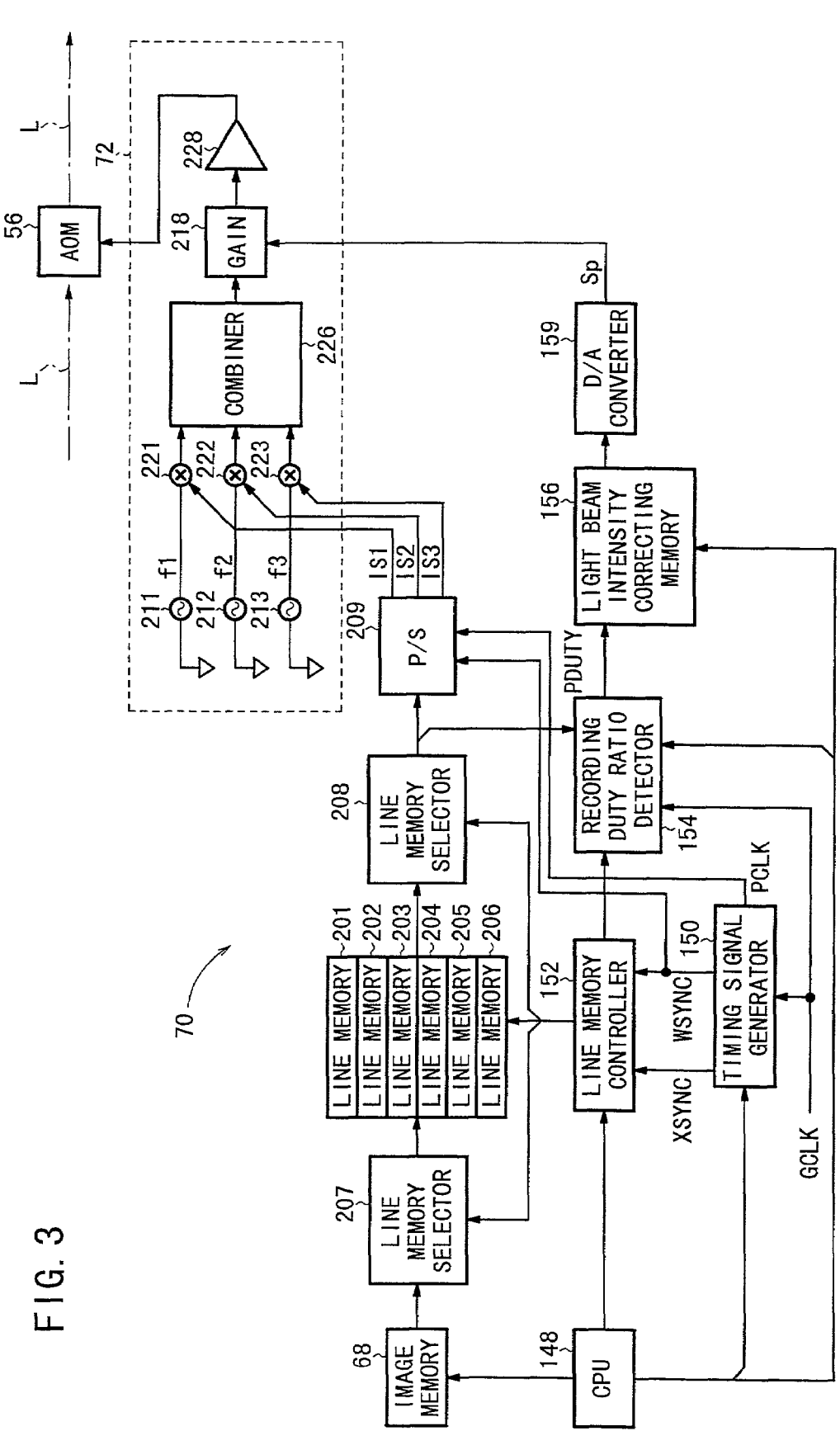
FIG. 3 is a block diagram of an exposure signal controller in the image recording apparatus.

FIG. 3 shows a circuit including the exposure signal controller 70 and the AOM driver 72 according to a first embodiment of the present invention.

As shown in FIG. 3, the exposure signal controller 70 has a timing signal generator 150 for generating various timing signals or clock signals such as a pixel clock (dot clock) signal PCLK, a word clock signal WCLK for every 16 pixels (16 bits), and a main scanning area clock signal XSYNC for determining a main scanning area on the photosensitive medium 32, in synchronism with the grating clock signal GCLK supplied from the grating clock generator 94.

Of those timing signals, the main scanning area clock signal XSYNC and the word clock signal WCLK are supplied to a line memory controller 152.

The line memory controller 152 basically controls reading and writing processes of six line memories 201-206 under the control of a CPU 148 as a control circuit or control means. The line memory controller 152 controls the six line memories 201-206, three at a time, to toggle between the reading and writing processes in synchronism with the main scanning area clock signal XSYNC.

Prior to recording an image on the photosensitive medium 32, each of the line memories 201-206 is supplied with one main scanning line of image data, i.e., binary on/off image data composed of 54400 pixels or dots, from the image memory 68 whose reading and writing processes are controlled by the CPU 148 via an input line memory selector 207 in the writing process controlled by the line memory controller 152.

In an image recording operation, while image data are being supplied from the image memory 68 to one bank of line memories 201-203 (or 204-206), new image data are supplied from the other bank of line memories 204-206 (or 201-203) via an output line memory selector 208 to three parallel-to-serial converters 209. For an easier understanding, the three parallel-to-serial converters 209 are shown as one parallel-to-serial converter.

In synchronism with the word clock signal WCLK and the pixel clock signal PCLK, the parallel-to-serial converters 209 output respective binary image signals IS1-IS3 each representing serial data having a value 0 (low level) or a value 1 (high level) to the AOM driver 72.

The AOM driver 72 comprises signal generators 211-213 for generating respective signals f1-f3 having a constant amplitude and respective different high frequencies f1-f3, multipliers 221-223 for multiplying the binary image signals IS1-IS3 by the respective signals f1-f3, a combiner 226 for combining product signals from the multipliers 221-223, a voltage control gain varying circuit 218 for adjusting the amplitude of a combined signal outputted from the combiner 226, and an amplifier 228 for amplifying and applying the amplitude-adjusted combined signal to a control terminal of the AOM 56.

Based on the frequencies f1-f3 of the signal outputted from the amplifier 228, the AOM 56 processes the single light beam L into three light beams L that are offset on the photosensitive medium 32 in the auxiliary scanning direction Y, intensity-modulates and outputs the three light beams L based on the amplitude of the output signal from the amplifier 228.

Therefore, the three light beams L are turned on and off in synchronism with the values 1, 0 (on and off) of the binary image signals IS1-IS3.

Figure 4:
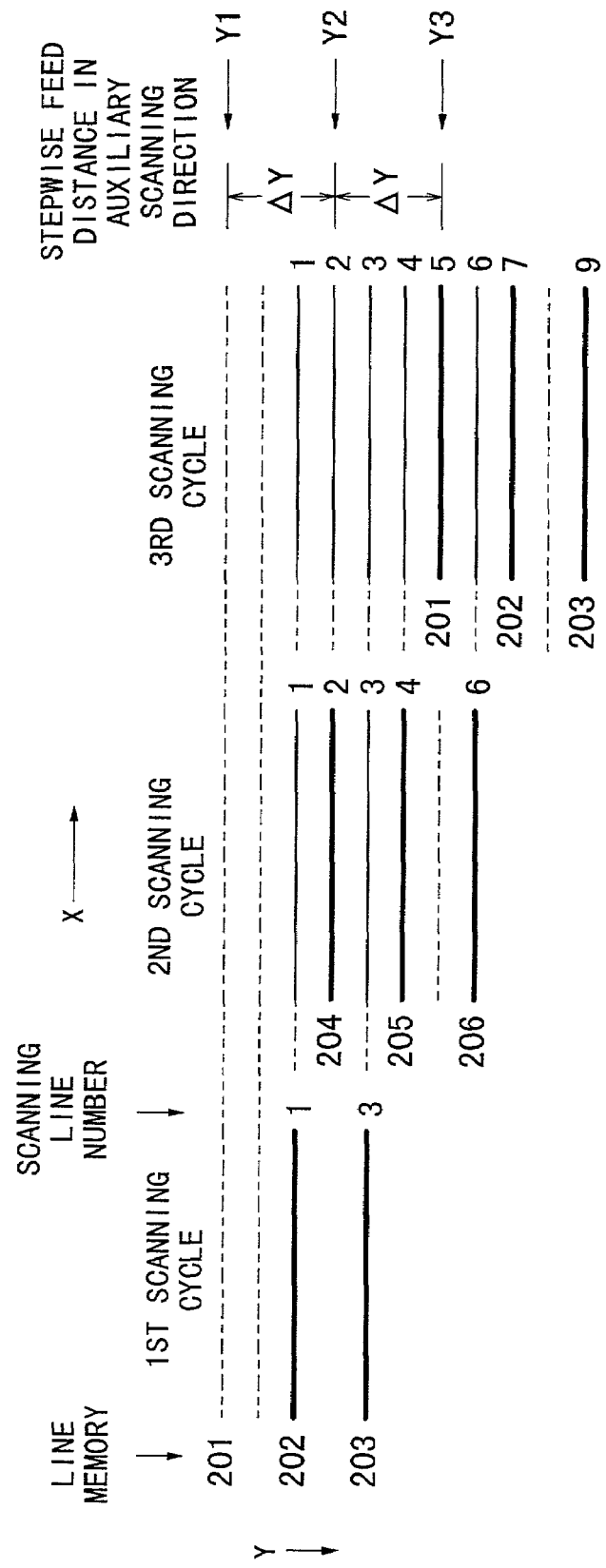
FIG. 4 is a diagram illustrative of an interlaced scanning process for simultaneously recording three scanning lines.

FIG. 4 shows an interlaced scanning process for simultaneously recording images of three scanning lines that are offset in the auxiliary scanning direction Y on the photosensitive medium 32. First, the interlaced scanning process for simultaneously recording three scanning lines will be described below.

In an auxiliary scanning position Y1, images of first and third scanning lines, indicated by scanning line numbers in FIG. 4, are recorded on the photosensitive medium 32 with two light beams L based on the image data stored in the line memories 202, 203. In this scanning cycle, all image data stored in the line memory 201 are set to 0.

Then, the photosensitive medium 32 is fed stepwise a distance ΔY in the auxiliary scanning direction to a position Y2 (=Y1+ΔY) by the auxiliary scanning motor 98. In this position Y2, images of second, fourth, and sixth scanning lines are recorded on the photosensitive medium 32 with three light beams L based on the image data stored in the line memories 204, 205, 206.

Thereafter, the photosensitive medium 32 is fed again stepwise a distance ΔY in the auxiliary scanning direction to a position Y3 (=Y2+ΔY=Y1+2ΔY) by the auxiliary scanning motor 98. In this position Y3, images of fifth, seventh, and ninth scanning lines are recorded on the photosensitive medium 32 with three light beams L based on the image data stored in the line memories 201, 202, 203.

While the images are being recorded on the photosensitive medium 32 based on the image data stored in one bank of the line memories 201-203 or 204-206, new image data are supplied from the image memory 68 to the other bank of the line memories 204-206 or 201-203. In this manner, the line memories 201-206 are operated in a toggled fashion, i.e., one bank at a time, to record images scanning lines on the photosensitive medium 32.

The above toggled image recording operation is repeated until a desired two-dimensional image is recorded in a desired area on the photosensitive medium 32.

Information as to which scanning line's image data are to be stored in which of the line memories 201-206 is stored in a memory in the CPU 148, and the line memory controller 152 controls the line memories 201-206 based on the stored information.

The toggled operation of the line memories 201-206 and the interlaced scanning process for simultaneously recording images of three scanning lines shown in FIG. 4 make it possible to shorten a period of time required to record a two-dimensional image on the photosensitive medium 32. However, the principles of the present invention are not limited to the interlaced scanning process for simultaneously recording images of three scanning lines.

In FIG. 3, when an image is recorded on the photosensitive medium 32, image data corresponding to a given area in the image are supplied from the line memories 201-206 via the line memory selector 208 to a recording duty ratio detector 154 as a recording duty ratio detecting means which is controlled by the line memory controller 152.

The recording duty ratio detector 154 which is also controlled by the CPU 148 detects the number of data that are turned on, i.e., the number of pixels having a value 1, in the given area in the image, determines the percentage of the number of turned-on data (the number of recording pixels of an image area in the given area) in the number of all pixels in the given area, or a recording duty ratio PDUTY defined by the percentage, and supplies the recording duty ratio PDUTY to a light beam intensity correcting memory (also referred to as "amount-of-exposure control memory") 156 that is controlled by the CPU 148.

The light beam intensity correcting memory 156 operates as a light beam intensity modulating means for modulating the intensity of the light beam L based on the recording duty ratio PDUTY determined by the recording duty ratio detector 154.

Figure 5:
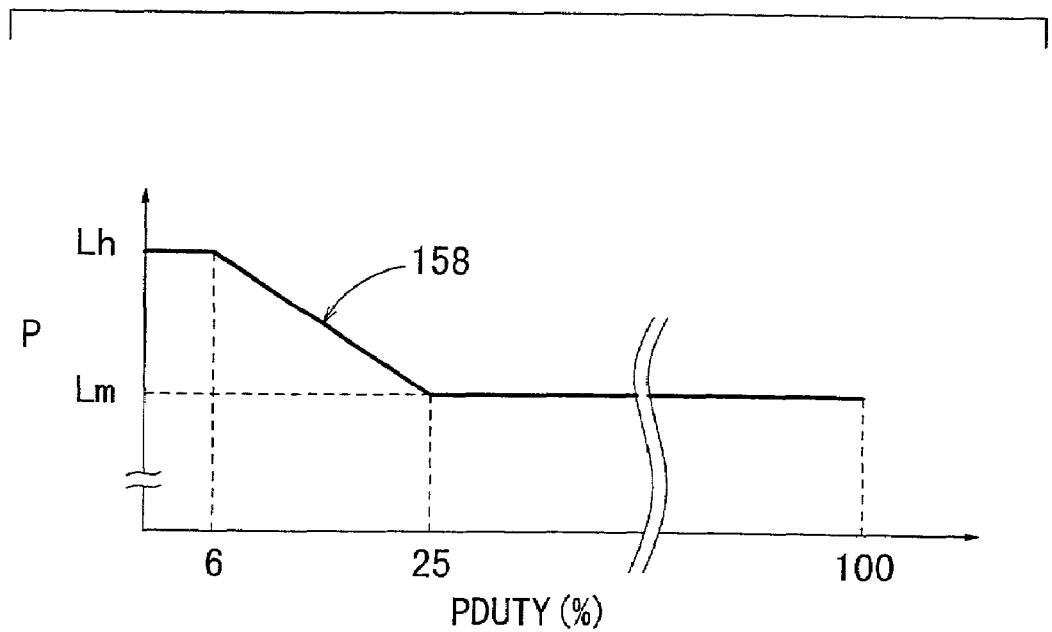
FIG. 5 is a diagram showing an amount-of-light control characteristic curve.

FIG. 5 shows an amount-of-light control characteristic curve 158 that is set in the light beam intensity correcting memory 156. The amount-of-light control characteristic curve 158 can be modified as desired by the CPU 148.

In FIG. 5, the horizontal axis represents the recording duty ratio PDUTY in % and the vertical axis represents the amount of recording light P. In the example shown in FIG. 5, when the recording duty ratio PDUTY is in a range from 0 to 6%, the amount of recording light P is set to a level Lh (also referred to as "highlight level Lh") for increasing the intensity of the light beam L. When the recording duty ratio PDUTY is in a range from 6 to 25%, the amount of recording light P is set to a level that linearly decreases from the highlight level Lh to a medium level Lm. When the recording duty ratio PDUTY is in a range from 25 to 100%, the amount of recording light P is set to the medium level Lm.

Since the recording duty ratio PDUTY is determined as the percentage of the number of turned-on data (the number of recording pixels of an image area in the given area) in the number of all pixels in the given area, as described in detail later on, the amount-of-light control characteristic curve 158 is established such that the amount of recording light P is greater in a highlight area where the image is brighter, than in medium and shadow areas.

The recording duty ratio PDUTY represents the number of recording pixels that make up the image area in the given area. The horizontal axis in FIG. 5 may be considered as representing gradations from 0 to 100% of the image or halftone dot % of the halftone dot image.

Figure 6:
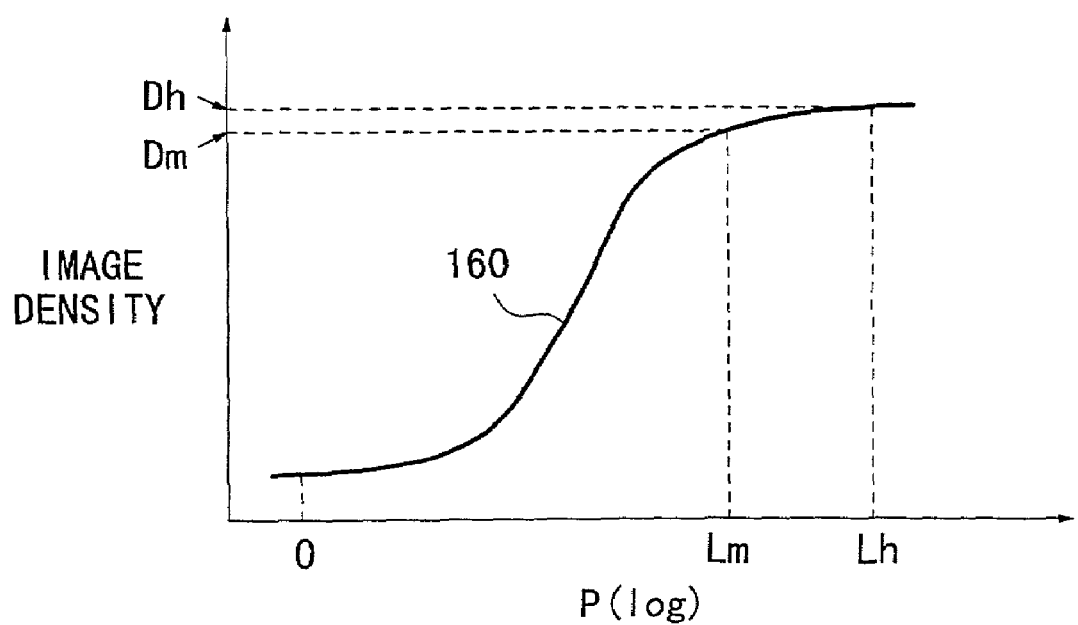
FIG. 6 is a diagram showing an image density characteristic curve.

FIG. 6 shows an image density characteristic curve 160 of an image that has been developed by the developing device 38 on the photosensitive medium 32. In FIG. 6, the horizontal axis represents the amount of recording light P on a logarithmic scale. The photosensitive medium 32 produces binary image densities when the amount of recording light P is of the zero level and the amount of recording light P is of the medium level Lm or the highlight level Lh.

It can be seen from the image density characteristic curve 160 that an image density Dh produced at the highlight level Lh is greater than an image density Dm produced at the medium level Lm.

In FIG. 3, the light beam intensity correcting memory 156 outputs an intensity correcting digital signal according to the amount-of-light control characteristic curve 158 shown in FIG. 5 to a D/A converter 162, which converts the intensity correcting digital signal into an intensity correcting analog signal Sp. The intensity correcting analog signal Sp is supplied to a voltage control input terminal of the voltage control gain varying circuit 218 of the AOM driver 72. The voltage control gain varying circuit 218 adjusts a gain to a value proportional to the magnitude of the intensity correcting analog signal Sp.

As a result, the amplitude of the combined signal outputted from the combiner 226 is adjusted by the voltage control gain varying circuit 218. The amplitude-adjusted signal is applied from the voltage control gain varying circuit 218 to the amplifier 228, which applies an amplified output signal to the AOM 56 to adjust the intensity of the light beam L outputted therefrom.

The printing plate producing system 30 is basically constructed as described above. Operation of the printing plate producing system 30 will now be described below with reference to FIG. 2.

When the printing plate producing system 30 is turned on, the scanner driver 74 supplies a drive signal to the resonant scanner 58 to start oscillating its mirror at a high speed.

The laser driver 48 supplies a drive signal to the synchronizing light source 50, which outputs a synchronizing light beam S. The synchronizing light beam S outputted from the synchronizing light source 50 is reflected and deflected by the resonant scanner 58, and guided by the scanning lens 59 and the reflecting mirrors 60, 84 to the reference grating 86.

The synchronizing laser beam S applied to the reference grating 86 successively passes through the slits 92 as the synchronizing laser beam S moves along the reference grating 86 in the main scanning direction X, and enters as a pulsed light signal into the light guide rod 88. The pulsed synchronizing laser beam S is repeatedly reflected in the light guide rod 88 and travels therethrough to the photosensors 90a, 90b on the respective ends of the light guide rod 88. The photosensors 90a, 90b convert the pulsed synchronizing laser beam S into an electric signal and supplies the electric signal to the grating clock generator 94.

The grating clock generator 94 shapes the waveform of the electric signal and multiplies its frequency thereby to generate a grating clock signal GCLK. The grating clock signal GCLK generated by the grating clock generator 94 is supplied to the exposure signal controller 70.

The exposure signal controller 70 converts image data read from the image memory 68 into an on/off modulated signal according to the supplied grating clock signal GCLK and clock signals whose frequencies are multiples of the frequency of the grating clock signal GCLK, and supplies the on/off modulated signal to the AOM driver 72. The AOM driver 72 supplies a drive signal which is a combination of signals having different frequencies, each turned on and off depending on the image data, to the AOM 56.

The recording light source 46 energized by the laser driver 44 outputs a light beam L for recording an image.

The light beam L is guided to the AOM 56 via the variable-transmittance ND filter 54 which has been adjusted by the displacing unit 66 to produce a light beam L having a predetermined amount of light. In the image recording process, the mechanical shutter 52 that is positioned in front of the variable-transmittance ND filter 54 is retracted out of the light path of the light beam L by the displacing unit 64.

The light beam L that is applied to the AOM 56 is turned on and off by the AOM 56 depending on the image data, and divided into a plurality of light beams having different frequencies, which are then supplied from the AOM 56 to the resonant scanner 58. The resonant scanner 58 reflects and deflects the light beams L, which are guided by the scanning lens 59 and the reflecting mirrors 60, 62 to the photosensitive medium 32.

The scanner driver 74 also supplies a scanning clock signal SCAN generated in each main scanning cycle to the auxiliary scanning motor driving clock generator 102. Based on the supplied scanning clock signal SCAN, the auxiliary scanning motor driving clock generator 102 generates and supplies a motor driving reference clock signal to the auxiliary scanning motor driver 104. Based on the supplied motor driving reference clock signal, the auxiliary scanning motor driver 104 generates a drive signal and applies the drive signal to energize the auxiliary scanning motor 98, which rotates the ball screw 100 about its own axis. The exposure stage 40 is now displaced in the auxiliary scanning direction Y in synchronism with the scanning clock signal SCAN.

Therefore, the light beam L modulated with the image data is applied to the photosensitive medium 32 in the main scanning direction X while the photosensitive medium 32 is being fed in the auxiliary scanning direction Y, thereby forming a two-dimensional image on the printing plate 32. The photosensitive medium 32 with the two-dimensional image formed thereon is delivered to the developing device 38, which develops the image recorded on the photosensitive medium 32. Thereafter, the photosensitive medium 32 is fed to a printing process.

Operation of an assembly including the recording duty ratio detector 154 incorporated in the printing plate producing system 30 will be described below.

Figure 7:
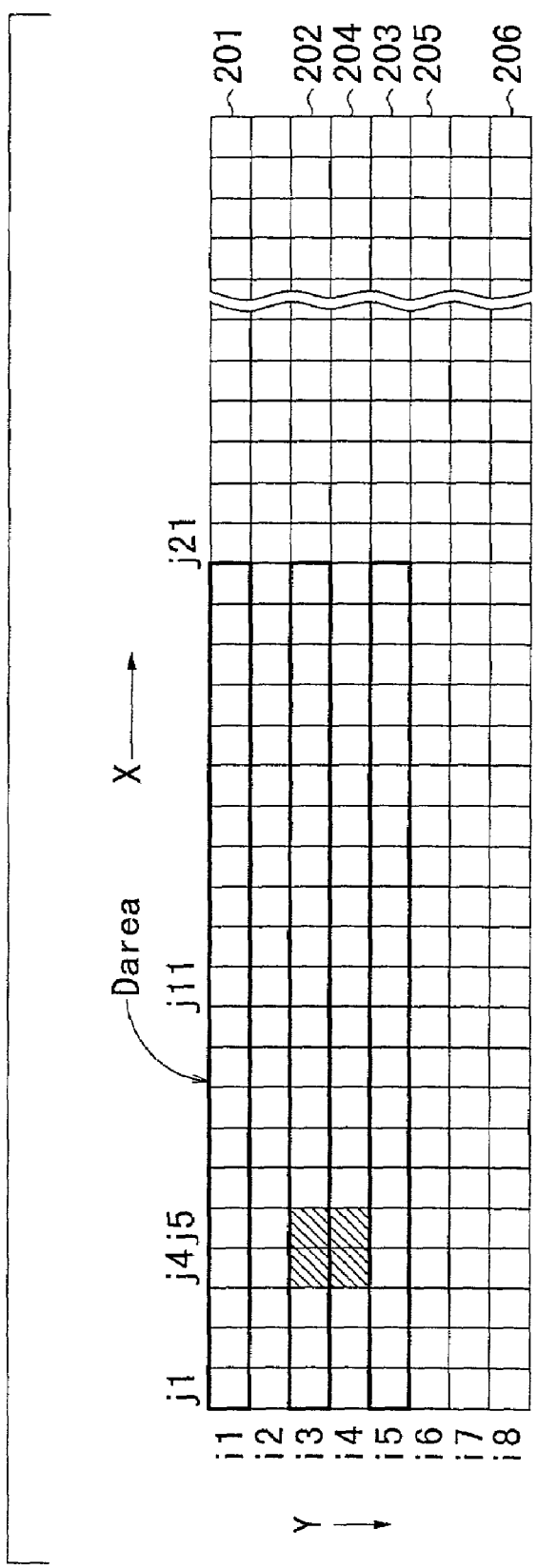
FIG. 7 is a diagram showing a determining region.

FIG. 7 schematically shows binary image data stored in some storage areas of the line memories 201-206. The line memories 201-206 which are shown in FIG. 7 contain image data representing four pixels to be blackened, i.e., turned-on pixels, only in those storage areas at coordinates that are indicated by main scanning lines i3, i4 arrayed in the auxiliary scanning direction Y and columns j4, j5 arrayed in the main scanning line X, and contain image data representing other pixels to be unblackened, i.e., turned-off pixels.

When main scanning lines i1, i3, i5 are to be simultaneously recorded based on image data recorded in the line memories 201-203 by the three light beams L, a determining area (also referred to as "detecting area") Darea is determined for detecting a recording duty ratio PDUTY corresponding to a given area in an image to be recorded on the photosensitive medium 32. In the example shown in FIG. 7, the determining area Darea is set to a two-dimensional area of 60 pixels which are made up of 3 pixels arrayed in the auxiliary scanning direction Y×20 pixels arrayed in the main scanning direction X.

First, the determining area Darea is established with respect to the pixel data of i1×(j1-j20), i3×(j1-j20), i5×(j1-j20) at a leading position in the main scanning position X. A recording duty ratio PDUTY in the established determining area Darea, i.e., an average recording duty ratio PDUTY, is detected as PDUTY=(2/60)×100=3.3%.

The recording duty ratio PDUTY (=3.3%) detected by the recording duty ratio detector 154 is supplied to the light beam intensity correcting memory 156. In the light beam intensity correcting memory 156, the amount-of-light control characteristic curve 158 shown in FIG. 5 is referred to, and an amount of recording light P for the determining area Darea is selected as the highlight level Lh (P=Lh). The magnitude of the intensity correcting analog signal Sp supplied from the D/A converter 159 to the voltage control gain varying circuit 218 is now set to a value corresponding to the highlight level Lh.

Therefore, an area on the photosensitive medium 32 which corresponds to the determining area Darea is exposed to the amount of recording light P at the highlight level Lh, with the result that the image density in that area becomes a high density Dh (see FIG. 6).

The recording duty ratio detector 154 then establishes a determining area Darea for the pixel data i×(j21-j40), i3×(j21-j40), i5×(j21-j40) at a next position in the main scanning position X, and detects a recording duty ratio PDUTY in the established determining area Darea. Based on the detected recording duty ratio PDUTY, the light beam intensity correcting memory 156 determines an amount of recording light P in the determining area of i1×(j21-j40), i3×(j21-j40), i5×(j21-j40).

After the scanning of the photosensitive medium 32 with the main scanning lines i1, i3, i5 is finished, the recording duty ratio detector 154 establishes a determining area Darea for the pixel data i4×(j21-j40), i6×(j21-j40), i8×(j21-j40) for next main scanning lines i4, i6, i8, and detects a recording duty ratio PDUTY in the established determining area Darea.

Thereafter, recording duty ratios PDUTY are successively detected, amounts of recording light P are determined based on the detected recording duty ratios PDUTY, and images are recorded on the photosensitive medium 32.

Actually, the time when the recording duty ratio detector 154 detects the recording duty ratio PDUTY is slightly out of phase with the image signals IS1-IS3 that are supplied via the parallel-to-serial converters 209 to the AOM driver 72. However, if it is taken into consideration that one halftone dot comprises 200 pixels×200 pixels, then a practically sufficient level of accuracy is achieved.

A recording duty ratio PDUTY can also be determined as a moving average. Specifically, a recording duty ratio PDUTY is detected in the determining area Darea with respect to the pixel data of i1×(j1-j20), i3×(j1-j20), i5×(j1-j20), and then a recording duty ratio PDUTY is detected in the determining area Darea with respect to the pixel data of i1×(j2-j21), i3×(j2-j21), i5×(j2-j21). A moving average may not be determined based on every single pixel, but may be determined based on every plural pixels.

Figure 8:
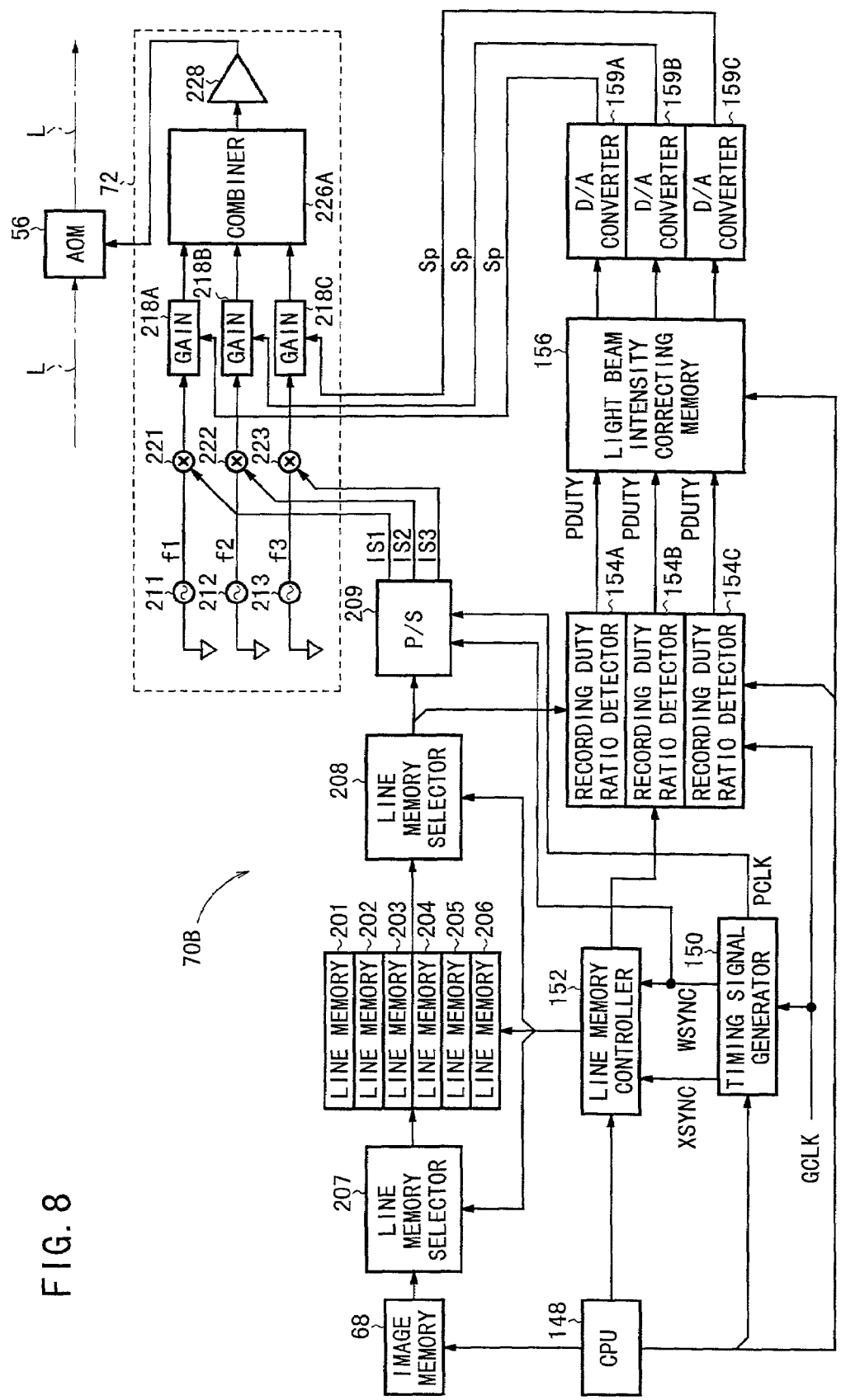
FIG. 8 is a block diagram of another exposure signal controller.

In the exposure signal controller 70 shown in FIG. 3, an average recording duty ratio PDUTY in an area of 60 pixels is detected to energize the AOM driver 72. FIG. 8 shows a modified exposure signal controller 70B which has three recording duty ratio detectors 154A-154C for successively detecting respective recording duty ratios PDUTY each for 20 pixels in the main scanning direction. The light beam intensity correcting memory 156 produces amounts of recording light P with respect to the respective light beams L, which are converted by respective D/A converters 159A-159C into intensity correcting analog signals Sp that control the gains of three voltage control gain varying circuits 218A-218C. Gain-controlled signals outputted from the voltage control gain varying circuits 218A-218C are combined by a combiner 226A. In this manner, the amounts of recording light P of the three light beams L can individually be adjusted.

Figure 9:
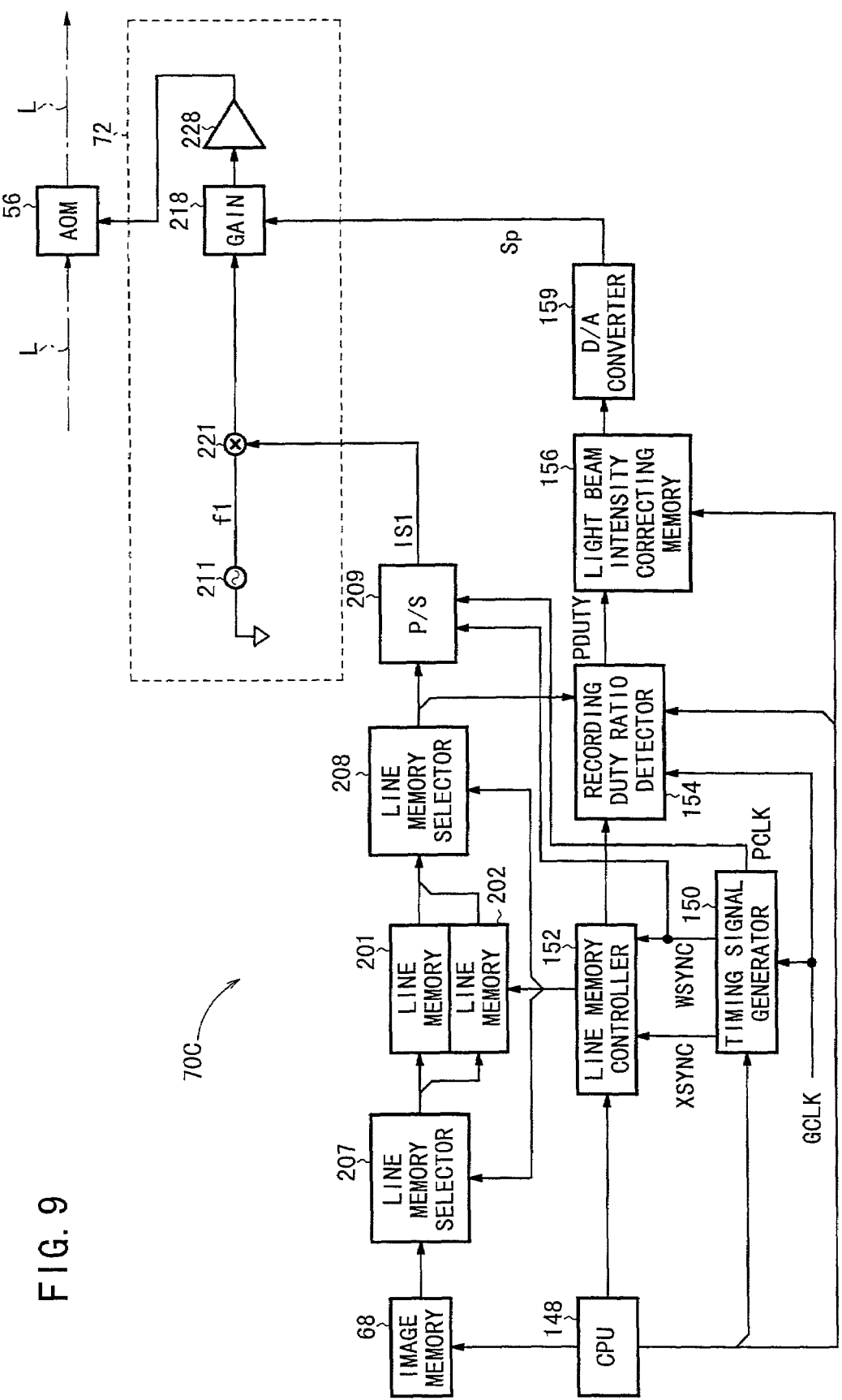
FIG. 9 is a block diagram of still another exposure signal controller.

As shown in FIG. 9, the principles of the present invention are also applicable to still another exposure signal control circuit 70C for controlling a single light beam L. The intensity of the signal light beam L may be modulated by an EOM (Electro-Optic Modulator) which operates based on an electro-optic effect that a refractive index varies when an electric field is applied, rather than being modulated by the AOM 56.

Various modifications of the present invention will be described below.

Modification 1: Elimination of possible beats caused by an interference between the halftone dot pattern of a halftone dot image signal and a given area (an area of 3 pixels ×20 pixels in FIG. 7) in which a recording duty ratio PDUTY is determined.

It has been found that if the size of a given area used for detecting a recording duty ratio PDUTY (i.e., the size of area Darea for determining whether the halftone % of an image to be recorded on the photosensitive medium 32 is in a highlight range or a medium range) is smaller than a halftone dot size (for example, in the above embodiment, the halftone dot size is about 200 pixels×200 pixels whereas the size of area Darea is 3 pixels×20 pixels), then the area of the medium halftone %, where the amount of light should not be increased, is erroneously recognized as a highlight area. Accordingly, the amount of light is increased, and if this phenomenon occurs periodically, it will interfere with the halftone dot pattern, resulting in beats that are visually perceived.

Figure 10:
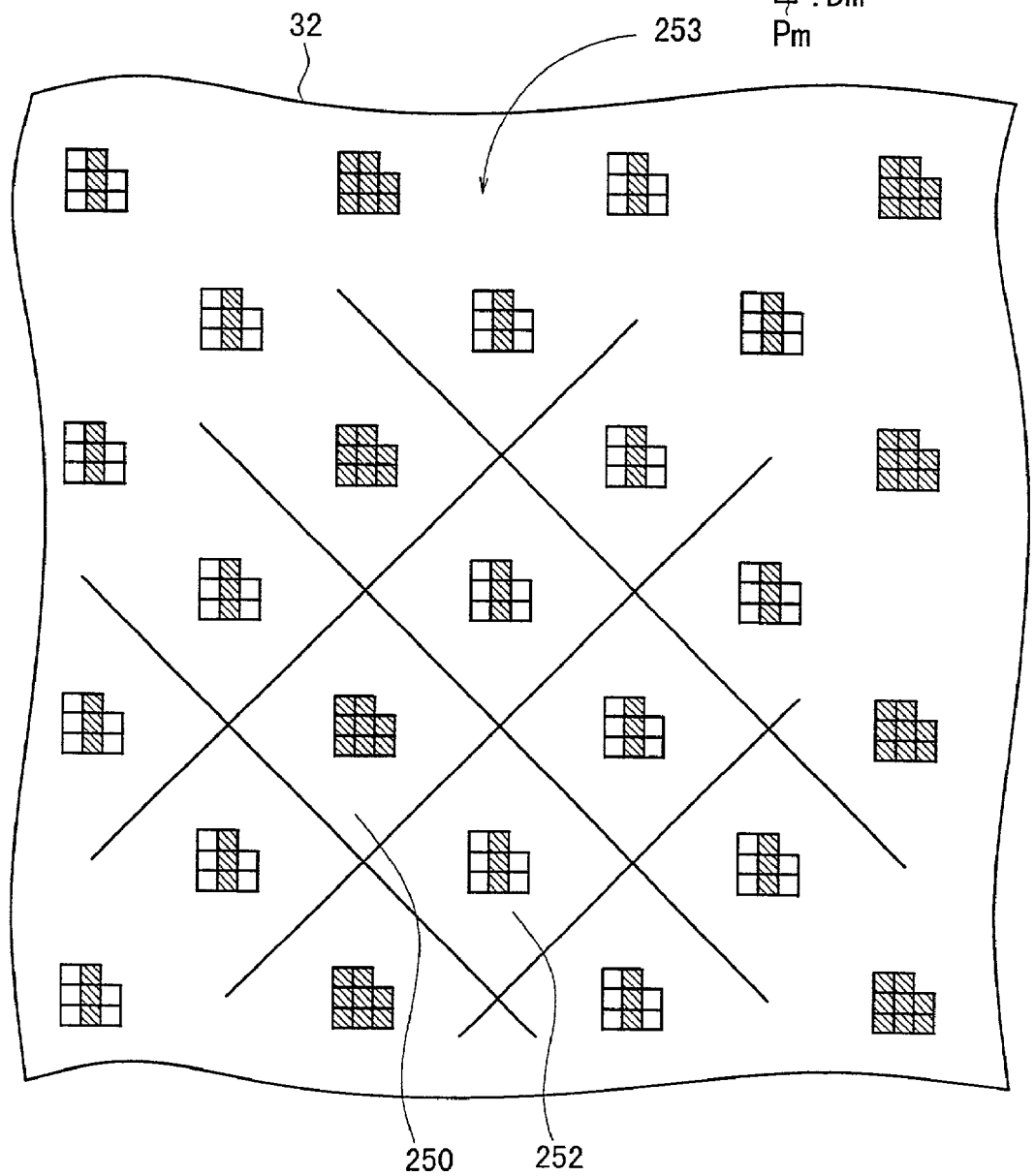
FIG. 10 is a diagram illustrative of the generation of beats.

FIG. 10 shows beats that occur between pixels recorded on the photosensitive medium 32 and halftone dots thereon. In FIG. 10, pixels Ph shown hatched have an image density equal to the image density Dh at the highlight level Lh, and pixels Pm shown blank have an image density equal to the image density Dm at the medium level Lm. Other areas in FIG. 10 are free of pixels.

In FIG. 10, all eight pixels that make up each of halftone dots in a vertical array including halftone dots 250 are blackened, and three of eight pixels that make up each of halftone dots in vertical arrays including halftone dots 252 positioned adjacent to the halftone dots 250 are blackened. As can be seen from FIG. 10, an image 253 which is composed of these halftone dots suffers periodic image density irregularities, i.e., beats.

In order to prevent beats from occurring, the size of the determining area Darea may be set to a size equal to or greater than a halftone dot area. However, the size of the determining area Darea thus set requires an increased amount of calculations, posing new problems in that resources such as the CPU 148, the memories, etc. need to operate at higher speeds or the power supply needs to be increased in capacity.

Figure 11:
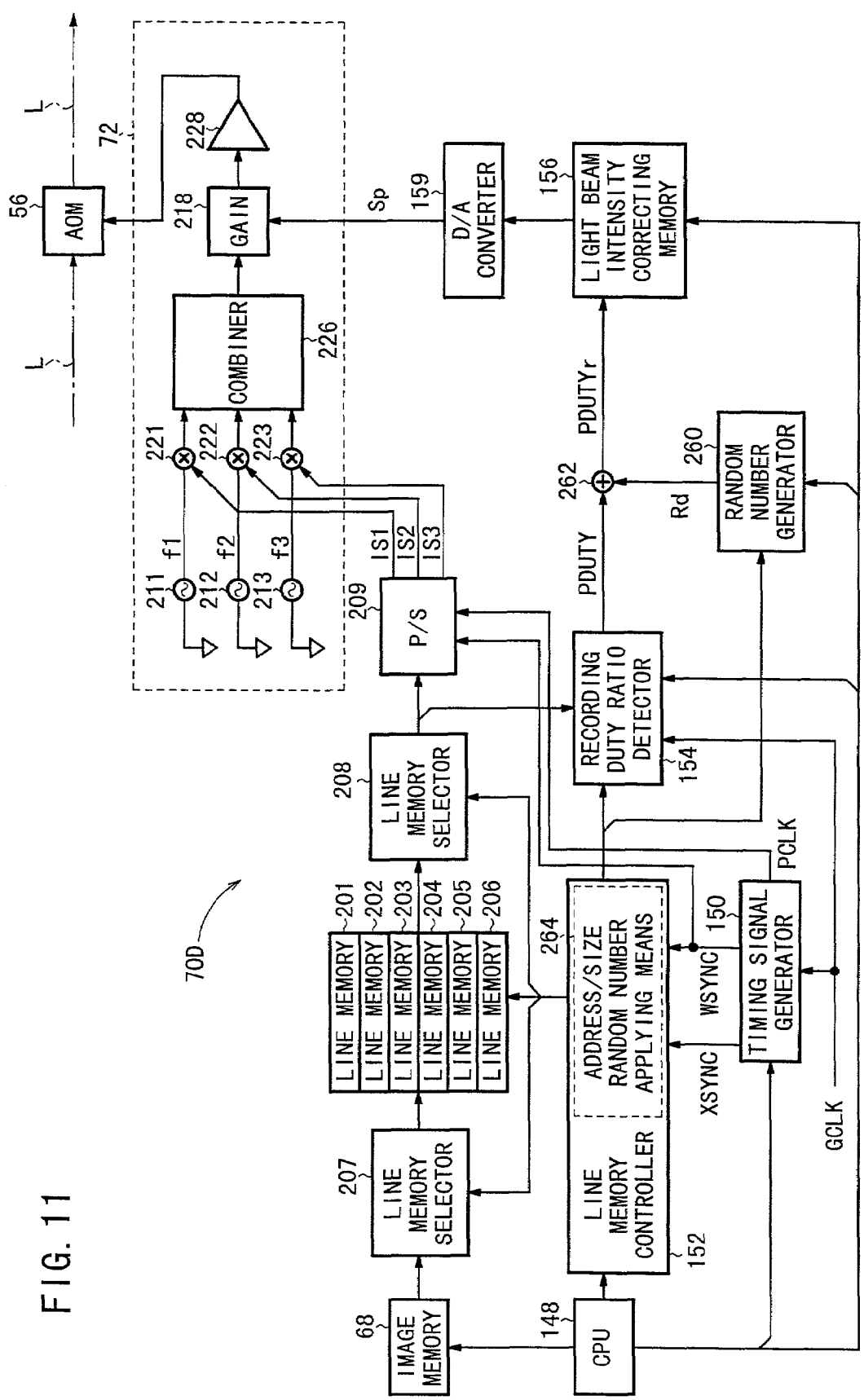
FIG. 11 is a block diagram of yet another exposure signal controller.

FIG. 11 shows an exposure signal controller 70D arranged to avoid beats without the need for an increased size for the determining area Darea. As shown in FIG. 11, the exposure signal controller 70D includes, in addition to the components of the exposure signal controller 70 shown in FIG. 3, a random number generator 260 whose timing of generating a random number is controlled by the line memory controller 152. A random number Rd generated by the random number generator 260 is added by an adder 262 to a recording duty ratio PDUTY detected by the recording duty ratio detector 154. The adder 262 supplies the sum signal representing the recording duty ratio PDUTYr with the random number added to the light beam intensity correcting memory 156. The random number Rd may be Rd=−1, 0, 1 (or −2, −1, 0, +1, +2).

The exposure signal controller 70D thus arranged is capable of avoiding beats even if the determining area Darea is smaller than a halftone dot area.

Rather than modulating the intensity of the light beam L based on the recording duty ratio PDUTYr which is the sum of the recording duty ratio PDUTY and the random number Rd, the line memory controller 152 may have an address/size random number applying means 264 for varying a readout address with a random number thereby to vary the position of the determining area Darea in the image with the random number or to vary the size of the determining area Darea in the image with the random number. Such an alternative arrangement is also capable of avoiding beats.

The exposure signal controller 70D shown in FIG. 11 can reduce periodic irregularities in the image to avoid beats caused by an interference with the halftone dot pattern.

Modification 2: Elimination of an inversion of the gradation.

As shown in FIG. 5, the amount-of-light control characteristic curve 158 that is set in the light beam intensity correcting memory 156 is established such that when the recording duty ratio PDUTY is in a range from 0 to 6%, the amount of recording light P is set to a highlight level Lh for increasing the intensity of the light beam L, when the recording duty ratio PDUTY is in a range from 6 to 25%, the amount of recording light P is set to a level that linearly decreases from the highlight level Lh to a medium level Lm, and when the recording duty ratio PDUTY is in a range from 25 to 100%, the amount of recording light P is set to the medium level Lm.

Figure 12:
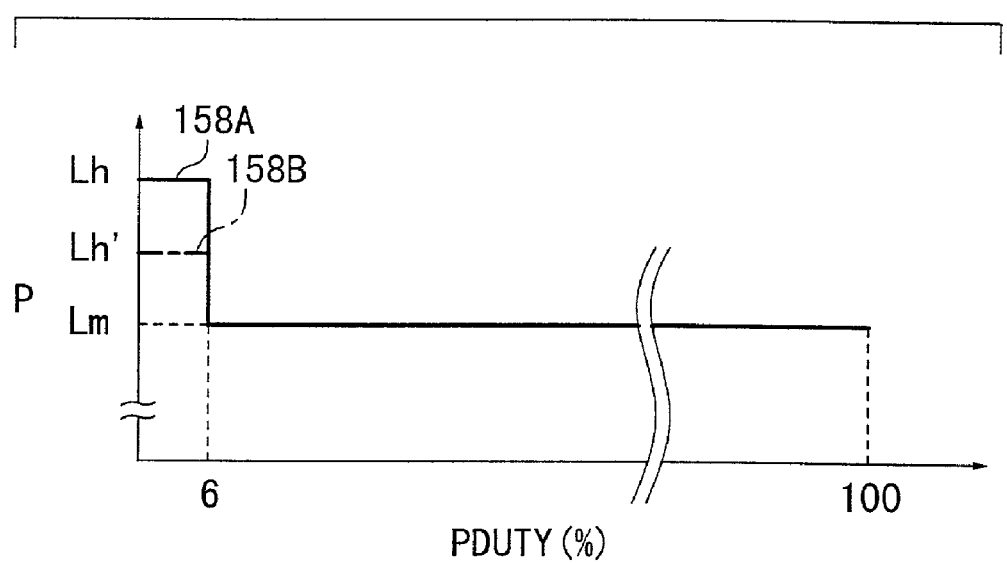
FIG. 12 is a diagram showing other amount-of-light control characteristics.

FIG. 12 shows a stepped amount-of-light control characteristic curve 158A that is established such that when the recording duty ratio PDUTY is in a range from 0 to 6%, the amount of recording light P is set to a highlight level Lh, and when the recording duty ratio PDUTY is in a range exceeding 6%, the amount of recording light P is set to a medium level Lm.

With the stepped amount-of-light control characteristic curve 158A, it is possible to reduce the storage capacity of the light beam intensity correcting memory 156. However, there is a possibility that an increase in the halftone % due to an increase in the area of the image area 24 (see FIG. 19) upon an increase in the amount of light may exceed an increase in the halftone % in the image data, resulting in a gradation inversion phenomenon.

To avoid such a gradation inversion phenomenon, the increase in the amount of light with respect to the detected PDUTY (halftone %) should not be as sharp as shown in FIG. 12, but may be set to the amount-of-light control characteristic curve 158 shown in FIG. 5, or may be set to an amount-of-light control characteristic curve 158B where the difference between a highlight level Lh' and the medium level Lm is smaller than with the amount-of-light control characteristic curve 158A, as indicated by the dot-and-dash line in FIG. 12. The amount-of-light control characteristic curve thus established is capable of preventing the gradation inversion phenomenon from occurring.

Modification 3: Elimination of a tail produced in the recorded image due to a change in the amount of recording light P between the highlight level Lh and the medium level Lm.

Figure 13:
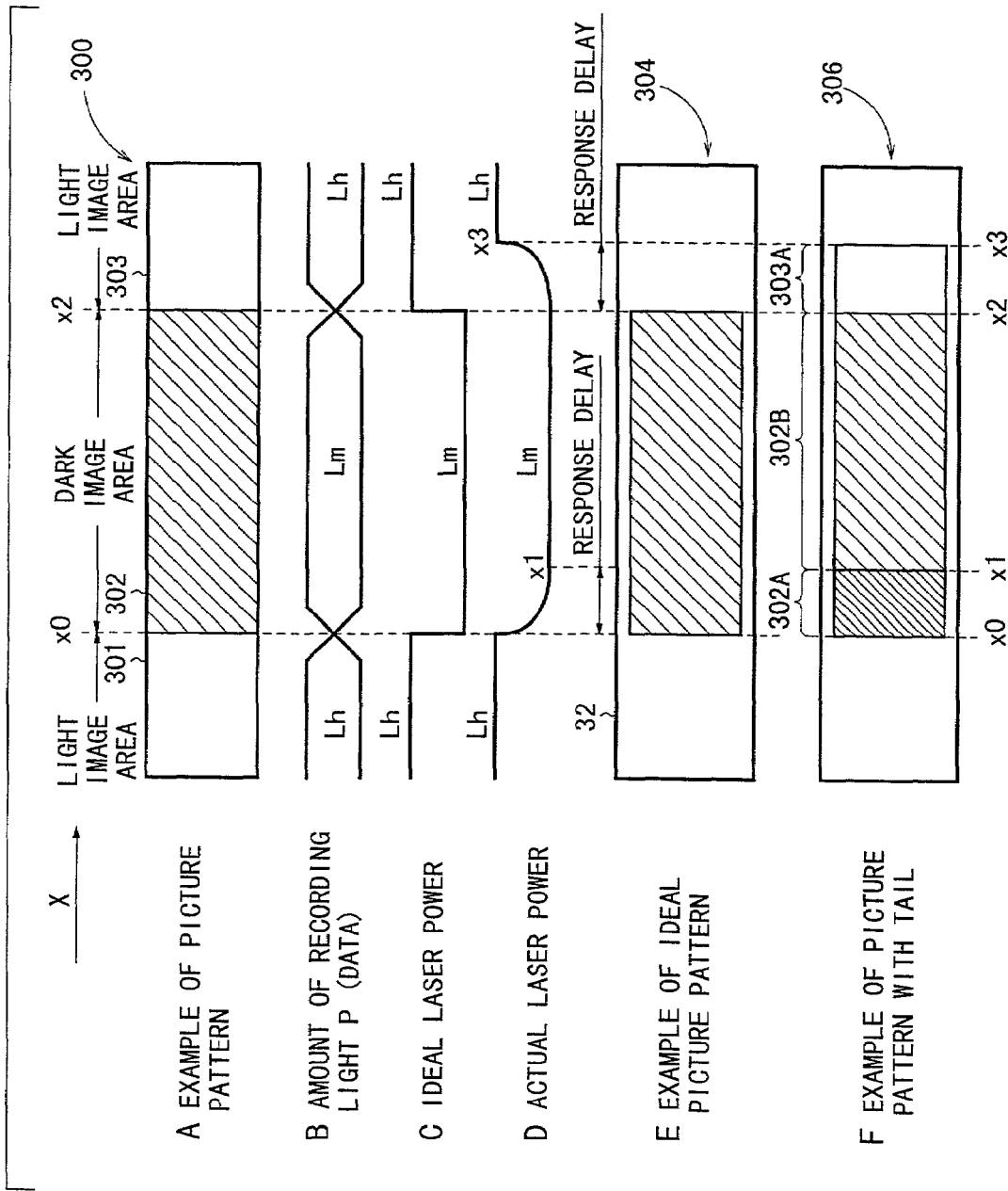
FIG. 13 is a diagram illustrative of a tailing phenomenon.

FIG. 13 is illustrative of a tailing phenomenon. FIG. 13 shows, at A, a picture pattern 300 of an image that may possibly cause a tailing phenomenon. The picture pattern 300 includes a light image area 301 corresponding to a highlight area in its trailing end (scanned earlier) in the main scanning direction X, a dark image area 302 following the light image area 301 in the main scanning direction X and corresponding to a medium area (including a shadow area), and a light image area 303 following the dark image area 302 in the main scanning direction X and corresponding to a highlight area.

FIG. 13 shows, at B, the manner in which the data of the amount of recording light P generated from the light beam intensity correcting memory 156 based on the recording duty ratio PDUTY detected by the recording duty ratio detector 154 changes with respect to the image date representing the picture pattern 300.

FIG. 13 shows, at C, the manner in which the ideal laser power (the amount of recording light) applied to the photosensitive medium 32 changes based on the amount of recording light P shown in FIG. 13 at B. According to the illustrated changes in the ideal laser power, the laser power falls instantaneously from the highlight level Lh to the medium level Lm at a position x0 and rises instantaneously from the medium level Lm to the highlight level Lh at a position x2, depending on the data of the amount of recording light P.

FIG. 13 shows, at D, changes in the actual laser power. Actually, the actual laser power has a response delay from the position x0 where the amount of recording light P changes, reaches the medium level Lm at a position x1, and reaches the highlight level Lh at a position x3.

FIG. 13 shows, at E, an ideal picture pattern 304 corresponding to the picture pattern 300 shown in FIG. 13 at A, when it is recorded on the photosensitive medium 32 with the ideal laser power shown in FIG. 13 at C. FIG. 13 shows, at F, a picture pattern 306 with a tail when it is recorded on the photosensitive medium 32 with the actual laser power shown in FIG. 13 at D. Each of the picture patterns 304, 306 is shown slightly wider than actual picture patterns in the auxiliary scanning direction Y.

As shown in FIG. 13 at F, a dark image area 302A between the positions x0 and x1 has its density highest at the position x0 and gradually reduced to a desired density of a dark image area 302B at the position x1, resulting in a tailing phenomenon, i.e., a phenomenon in which a density gradation takes place though the picture pattern has a constant density as indicated in the dark image area 302 in FIG. 13 at A. A light image area 303A between the positions x2 and x3 also suffers a tailing phenomenon where its density gradually decreases. However, the density change in the light image area 303A between the positions x2 and x3 is not distinct and cannot visually be perceived by human vision as the density in the light image area 303A is originally low. Therefore, the dark image area 302A suffering the tailing phenomenon between the positions x0 and x1 causes a major problem. The density of the dark image area 302B is of a constant level which is the same as the density of the dark image area 302.

Figure 14:
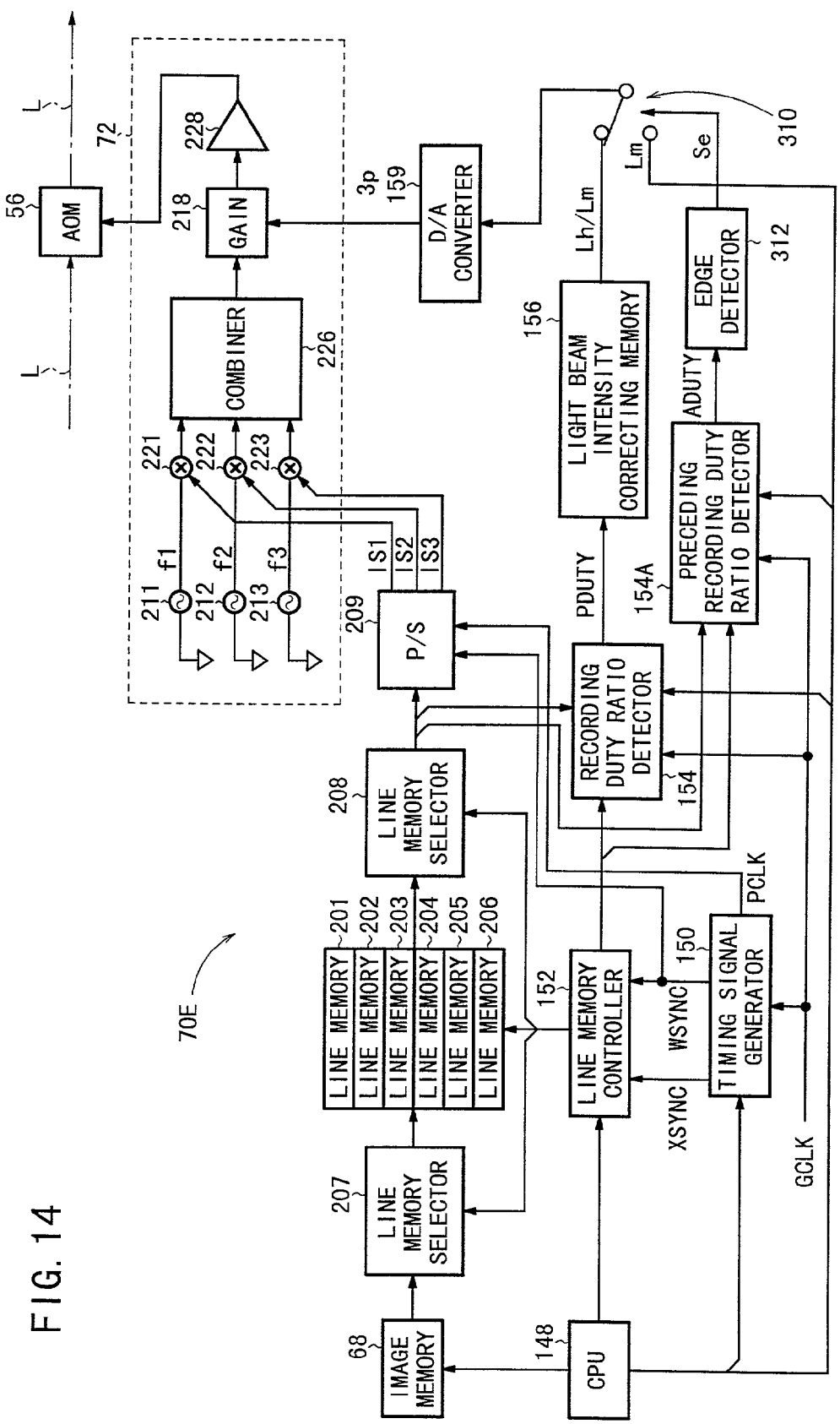
FIG. 14 is a block diagram of an exposure signal controller for eliminating a tailing phenomenon.

FIG. 14 shows an exposure signal controller 70E arranged to eliminate the tailing phenomenon described above with reference to FIG. 13 at A-F.

Figure 15:
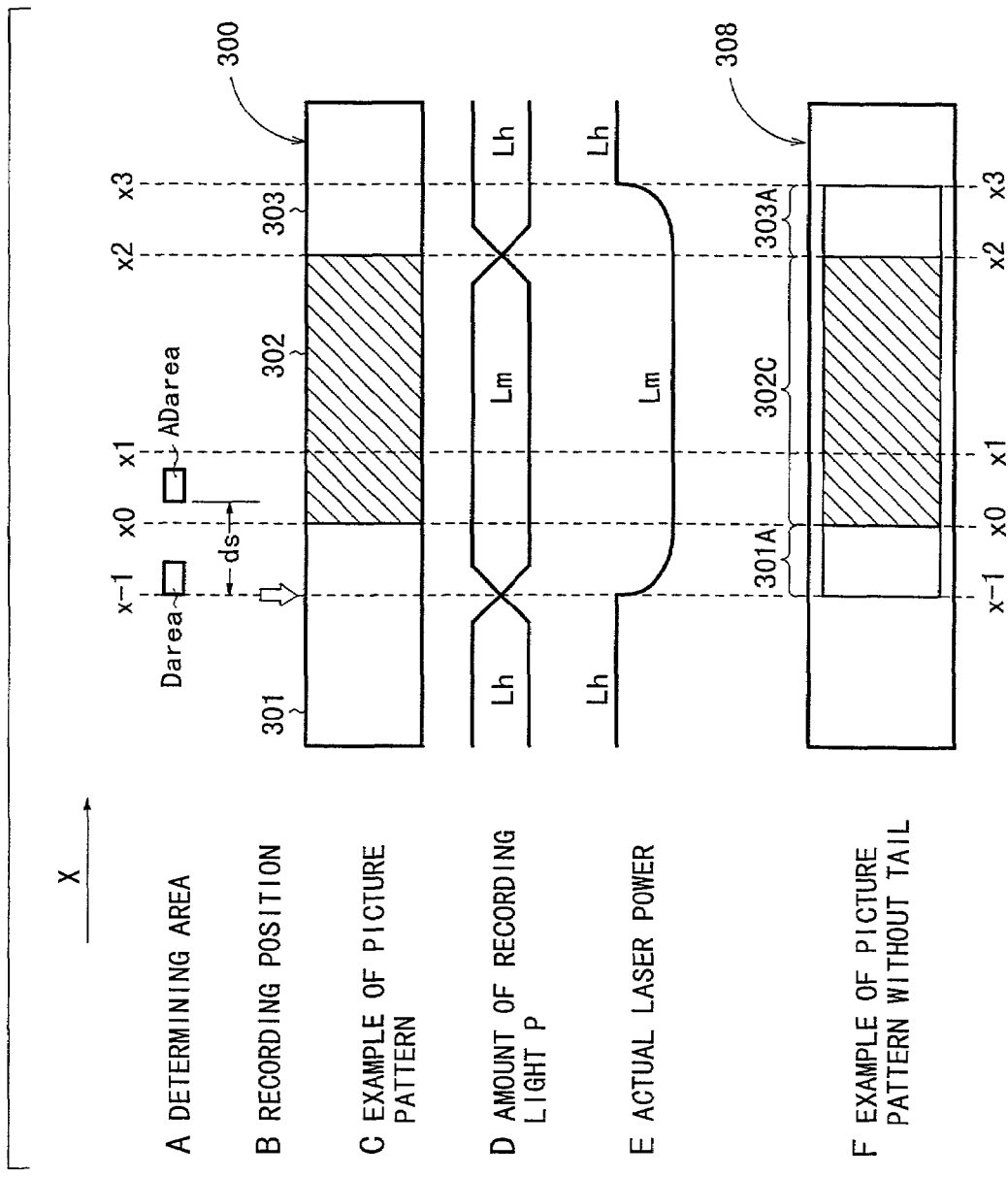
FIG. 15 is a diagram illustrative of a process of eliminating a tailing phenomenon.

FIG. 15 is illustrative of an algorithm for eliminating a tailing phenomenon using the exposure signal controller 70E. FIG. 15 shows, at C, the picture pattern 300 of an image that may possibly cause a tailing phenomenon as shown in FIG. 13 at A.

As shown in FIG. 14, the exposure signal controller 70E includes, in addition to the components of the exposure signal controller 70 shown in FIG. 3, a preceding recording duty ratio detector 154A for detecting a recording duty ratio at a position scanned later in the main scanning direction, i.e., a preceding position in the main scanning direction, than the recording duty ratio detector (referred to as "present recording duty ratio detector") 154 which detects a present recording duty ratio PDUTY, and an edge detector 312 serving as an intensity modulation correcting means for outputting a control signal Se to shift the common contact of a preceding amount-of-light changing switch 310 as a preceding amount-of-light changing means for detecting, prior to a recording process, the position x0 of an edge (changing point) where the density changes from the light image area 301 to the dark image area 302, from a change in the preceding recording duty ratio ADUTY outputted from the preceding recording duty ratio detector 154A and the highlight level (data) Lh outputted from the light beam intensity correcting memory 156, and changing the amount of recording light P from the highlight level Lh to the medium level Lm when the position of the edge x0 is detected.

The preceding amount-of-light changing switch 310 has a fixed contact connected to the light beam intensity correcting memory 156 for outputting the highlight level Lh or the medium level Lm, and another fixed contact connected to the CPU 148 for outputting the medium level Lm as a constant level.

In FIG. 14, the readout address of the determining area ADarea in an image for detecting the preceding recording duty ratio ADUTY with the preceding recording duty ratio detector 154A is specified by the line memory controller 152 or the CPU 148. As shown in FIG. 15 at A, the determining area needs to be a determining area (preceding determining area) ADarea that is scanned later than the determining area Darca of the recording duty ratio detector 154 by a time interval (preceding time interval) ds.

If the present recording position is a most trailing position in the main scanning direction X of the determining area Darea, as indicated by the downward arrow in FIG. 15 at B, then in order to detect the position x0 where the density changes from the highlight level to the medium level, the time interval ds is required to be longer than at least the response delay x1–x0 shown in FIG. 13 at D. For example, the time interval ds may be set to a value ranging from 1 to 2 times the response delay x1–x0.

If the time interval ds is set to the response delay x–x0, then when an image is recorded at the highlight level Lh based on the recording duty ratio PDUTY outputted from the recording duty ratio detector 154, i.e., when the recording duty ratio PDUTY is smaller than 6%, or when the preceding recording duty ratio ADUTY is set to a value equal or greater than 6% by the preceding recording duty ratio detector 154A (the example shown in FIG. 12), or the recording duty ratio PDUTY is equal to or greater than 25% (the example shown in FIG. 5), the control signal Se from the edge detector 312 is applied to shift the preceding amount-of-light changing switch 310 to supply the medium level Lm from the CPU 148 to the D/A converter 159. That is, the common contact of the preceding amount-of-light changing switch 310 is shifted from the light beam intensity correcting memory 156 to the CPU 148 to connect the input terminal of the D/A converter 159 to the CPU 148.

As indicated at a position x–1 in FIG. 15 at D, though the light image area 301 is being scanned, the amount of recording light P is reduced from the highlight level Lh to the medium level Lm at a preceding time. At this time, as shown in FIG. 15 at E, the actual laser power is gradually reduced.

At a position x2 where the image density changes from the dark image area 302 to the light image area 303, the edge detector 312 applies the control signal Se to connect the input terminal of the D/A converter 159 to the light beam intensity correcting memory 156 when the present recording duty ratio PDUTY of the present recording duty ratio detector 154 becomes a value to output the highlight level from the light beam intensity correcting memory 156, regardless of the value of the preceding recording duty ratio ADUTY of the preceding recording duty ratio detector 154A.

In this manner, as shown in FIG. 15 at D, the amount of recording light P is changed from the medium level Lm to the highlight level Lh at the position x2. The actual laser power gradually increases from the position x2 as shown in FIG. 15 at E.

With the laser power thus controlled, as indicated by a picture pattern 308 in FIG. 15 at F, the density of a dark image area 302C between the positions x0 and x1 does not change as compared with the picture pattern 306 shown in FIG. 13 at F. In the picture pattern 308 shown in FIG. 15 at F, the density is slightly reduced in a light image area 301A between the positions x–1 and x0 and a light image area 303A between the positions x2 and x3 because the actual laser power is reduced as shown in FIG. 15 at E. However, since the density of the light image areas 301, 303 of the original image 300 is low, the reduction in the density cannot visually be perceived. Accordingly, the tailing phenomenon can virtually be eliminated.

Specifically, in the exposure signal controller 70E shown in FIG. 14, the preceding determining area ADarea is provided in addition to the determining area Darea, and an image in a medium halftone % area where image irregularities are noticeable, i.e., the dark image area 302, is determined in advance. The amount of light starts being reduced before the light beam L reaches the edge position x0. In this manner, the slow response in controlling the amount of light is compensated for and will not be visually recognized as image irregularities.

In all of the embodiments described above, the recording duty ratio detector 154 comprises a digital circuit. However, the recording duty ratio detector 154 and the preceding recording duty ratio detector 154A may comprise an analog circuit.

Figure 16:
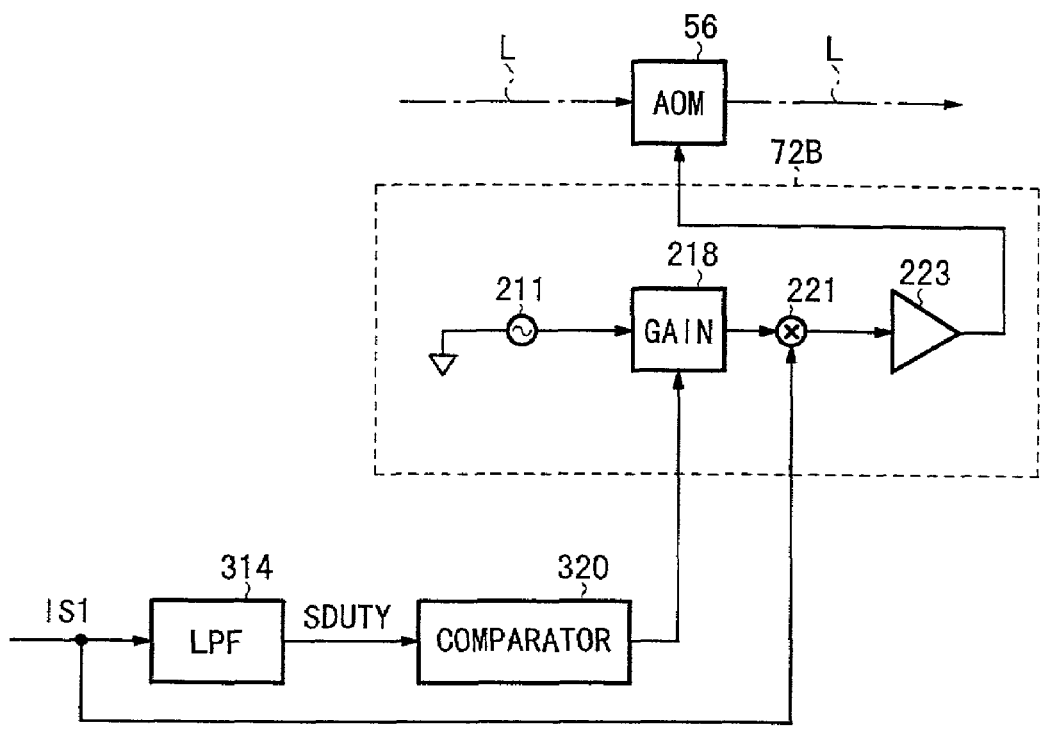
FIG. 16 is a block diagram of yet still another exposure signal controller.

FIG. 16 shows an exposure signal controller 70F where the recording duty ratio detector 154 is replaced with a low-pass filter in the form of an analog circuit. For the sake of brevity, a single light beam L is shown in FIG. 16. However, a plurality of light beams such as three light beams may be employed.

In FIG. 16, a binary image signal IS1 which has a value 1 or 0 is supplied from the parallel-to-serial converter 209 to a low-pass filter 314 and also to an input terminal of a multiplier 221 of an AOM driver 72B. The AOM driver 72B differs from the AOM driver 72 shown in FIG. 9 in that the voltage control gain varying circuit 218 and the multiplier 221 are switched around. The positions of the voltage control gain varying circuit 218 and the multiplier 221 are of design matter, and hence can be changed as desired in design.

The low-pass filter 314 has its output value increased depending on the probability of appearance of the value 1 of the binary image signal IS1. Specifically, the low-pass filter 314 outputs a signal SDUTY proportional to the recording duty ratio PDUTY of the binary image signal IS1. The signal SDUTY from the low-pass filter 314 is compared by a comparator 320, which outputs a binary signal to control the gain of the voltage control gain varying circuit 218 in a binary fashion.

With the low-pass filter 314 used as the recording duty ratio detector, the circuit arrangement is highly simplified because no counting means and memory are required. The comparator 320 may be replaced with an amplifier whose amplifying characteristic curve approximates the amount-of-light control characteristic curve 158 shown in FIG. 5.

Figure 17:
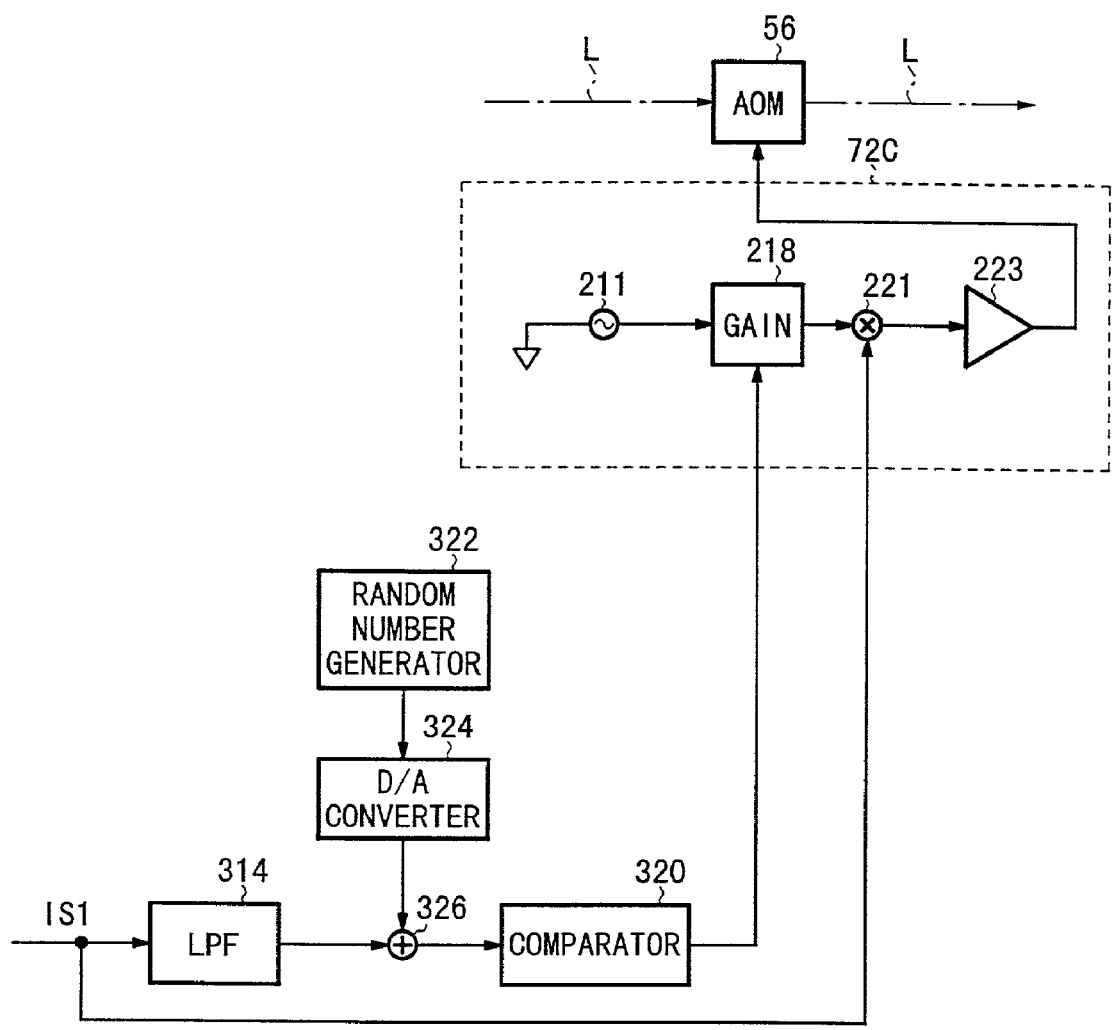
FIG. 17 is a block diagram of a further exposure signal controller.
Figure 18:
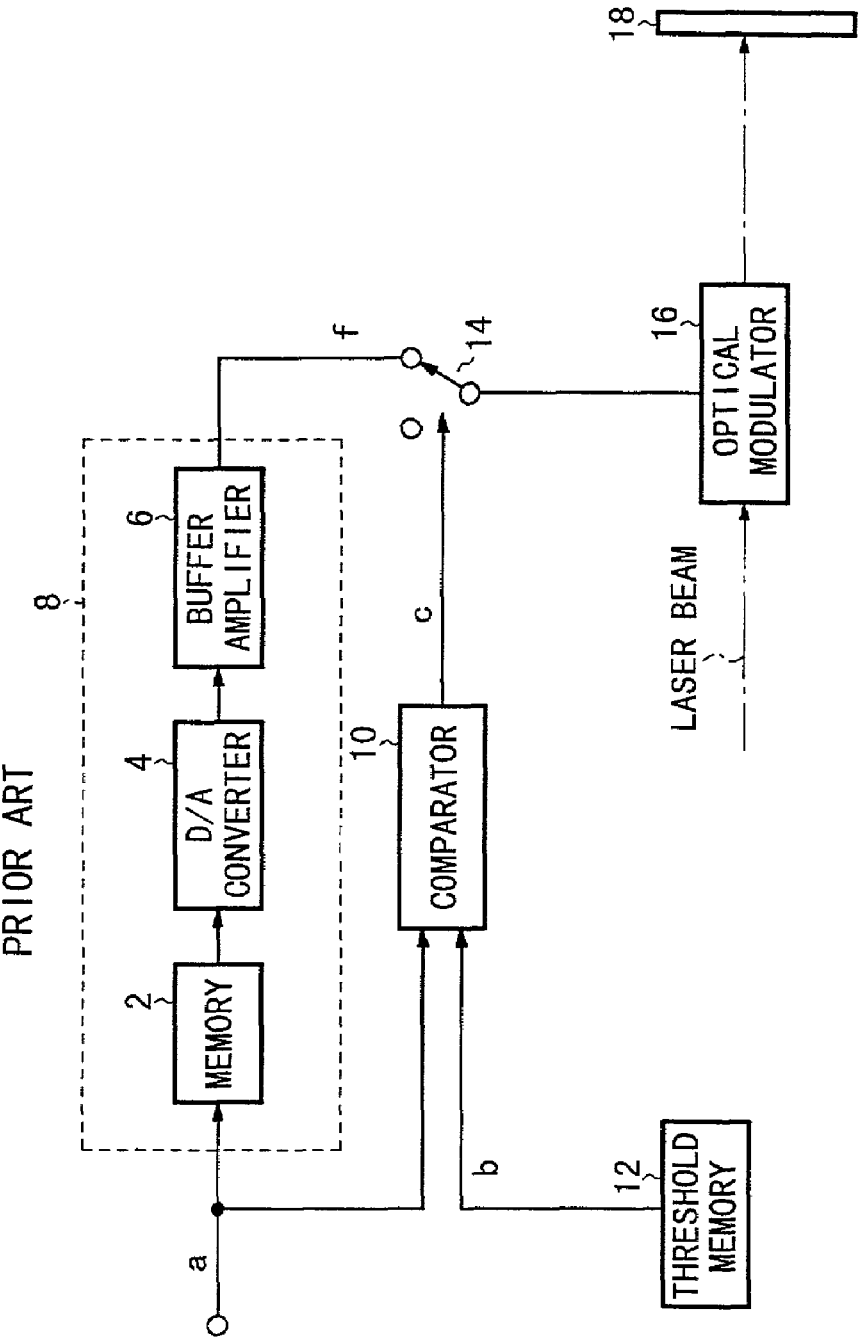
FIG. 18 is a block diagram of a conventional image recording apparatus.

The time constant of the low-pass filter 314 possibly tends to produce beats due to interference with the halftone dot pattern. To avoid such beats, as shown in FIG. 17, a random number Rd may be generated by a random number generator 322 and a D/A converter 324 and added to the signal from the low-pass filter 314 by an adder 326 connected between the low-pass filter 314 and the comparator 320.

According to the present invention, as described above, the recording duty ratio of an image to be recorded on the photosensitive medium is detected before the image is actually recorded on the photosensitive medium, and the amount of light applied to record the image is controlled based on the detected recording duty ratio. Therefore, the amount of recording light can be corrected highly accurately.

For example, if the photosensitive medium is of such a nature that an area irradiated with light remains as an image, then the intensity of a light beam applied thereto is modulated to a higher level in a highlight area of the image. Therefore, the plate wear resistance of the photosensitive medium in the highlight area is maintained at a sufficient level, image irregularities are prevented from occurring.

Thus, the intensity of the light beam can be controlled with higher accuracy in smaller ranges than halftone %.

The amount of recording light can be corrected without the need for a correcting memory table. Since no correcting memory table is used, the image recording apparatus is simple in arrangement and low in cost.

Although certain preferred embodiments of the present invention have been shown and described in detail, it should be understood that various changes and modifications may be made therein without departing from the scope of the appended claims.

What is claimed is:

1. An apparatus for recording an image by scanning a photosensitive medium with a light beam generated based on an image signal, comprising:
   recording duty ratio detecting means for detecting a recording duty ratio of an image to be recorded on the photosensitive medium based on the image signal; and
   light beam intensity modulating means for modulating the intensity of the light beam based on the detected recording duty ratio,
   wherein said photosensitive medium is of such a nature that an area irradiated with light remains as an image, and
   wherein said light beam intensity modulating means comprises means for modulating the intensity of the light beam to a higher level when recording pixels are in a highlight area of the image when compared to recording pixels in other areas of the image that have higher gradation values.

2. An apparatus according to claim 1, wherein said highlight area is defined by a given area on said photosensitive medium with a gradation value that is less than 25% of all gradations of said image recorded on said photosensitive medium.

3. An apparatus according to claim 1, wherein said recording duty ratio detecting means comprises a low-pass filter.

4. An apparatus according to claim 1, wherein said recording duty ratio detecting means comprises means for detecting a recording duty ratio corresponding to a given area in the image recorded on said photosensitive medium.

5. The apparatus according to claim 1, wherein the intensity of the light beam is set to a first intensity value for a highlight area that has a gradation value less than or equal to 6% of a maximum permissible gradation value for a given area on said photosensitive medium, and
   wherein the intensity of the light beam is set to a second intensity value, which is lower than the first intensity value, for an area of the image that has a gradation value greater than or equal to 25% of all gradations of said image recorded on said photosensitive medium.

6. The apparatus according to claim 5, wherein the intensity of the light beam transitions linearly from the first intensity value to the second intensity value for areas of the image that have gradation values between 6% and 25% of all gradations of said image recorded on said photosensitive medium.

7. A method of recording an image by scanning a photosensitive medium with a light beam generated based on an image signal, comprising the steps of:
   detecting a recording duty ratio of an image to be recorded on the photosensitive medium based on the image signal; and
   modulating the intensity of the light beam based on the detected recording duty ratio,
   wherein said photosensitive medium is of such a nature that an area irradiated with light remains as an image, and said step of modulating the intensity of the light beam comprises the step of modulating the intensity of the light beam to a higher level when recording pixels are in a highlight area of the image when compared to recording pixels in other areas of the image that have higher gradation values.

8. A method according to claim 7, wherein said highlight area is defined by a given area on said photosensitive medium with a gradation value that is less than 25% of all gradations of said image recorded on said photosensitive medium.

9. The method according to claim 7, wherein the intensity of the light beam is set to a first intensity value for a highlight area that has a gradation value less than or equal to 6% of a maximum permissible gradation value for a given area on said photosensitive medium, and
   wherein the intensity of the light beam is set to a second intensity value, which is lower than the first intensity value, for an area of the image that has a gradation value greater than or equal to 25% of all gradations of said image recorded on said photosensitive medium.

10. The method according to claim 9, wherein the intensity of the light beam transitions linearly from the first intensity value to the second intensity value for areas of the image that have gradation values between 6% and 25% of all gradations of said image recorded on said photosensitive medium.

11. An apparatus for recording an image by scanning a photosensitive medium with a light beam generated based on an image signal, comprising:
   a recording duty ratio detecting circuit that detects a recording duty ratio of an image to be recorded on the photosensitive medium based on the image signal; and
   a light beam intensity modulating circuit that modulates the intensity of the light beam based on the detected recording duty ratio,
   wherein said photosensitive medium is of such a nature that an area irradiated with light remains as an image, and
   wherein said light beam intensity modulating circuit modulates the intensity of the light beam to a higher level when recording pixels are in a highlight area of the image when compared to recording pixels in other areas of the image that have higher recording duty ratios.

12. The apparatus according to claim 11, wherein said highlight area is defined by a given area on said photosensitive medium with a gradation value that is less than 25% of all gradations of said image recorded on said photosensitive medium.

13. The apparatus according to claim 11, wherein the intensity of the light beam is set to a first intensity value for a highlight area that has a gradation value less than or equal to 6% of a maximum permissible gradation value for a given area on said photosensitive medium, and
   wherein the intensity of the light beam is set to a second intensity value, which is lower than the first intensity value, for an area of the image that has a gradation value greater than or equal to 25% of all gradations of said image recorded on said photosensitive medium.

14. The apparatus according to claim 13, wherein the intensity of the light beam transitions linearly from the first intensity value to the second intensity value for areas of the image that have gradation values between 6% and 25% of all gradations of said image recorded on said photosensitive medium.

* * * * *